United States Patent
Iida et al.

(10) Patent No.: US 7,567,230 B2
(45) Date of Patent: *Jul. 28, 2009

(54) LIQUID CRYSTAL DISPLAY DEVICE HAVING A LOW-VOLTAGE DRIVING CIRCUIT

(75) Inventors: Haruhisa Iida, Chiba (JP); Iwao Takemoto, Mobara (JP); Katsumi Matsumoto, Mobara (JP); Shigeo Adachi, Chiba (JP)

(73) Assignees: Hitachi, Ltd., Tokyo (JP); Hitachi Device Engineering Co., Ltd, Chiba-ken (JP)

( * ) Notice: Subject to any disclaimer, the term of this patent is extended or adjusted under 35 U.S.C. 154(b) by 600 days.

This patent is subject to a terminal disclaimer.

(21) Appl. No.: 11/212,577

(22) Filed: Aug. 29, 2005

(65) Prior Publication Data

US 2005/0280620 A1    Dec. 22, 2005

Related U.S. Application Data

(63) Continuation of application No. 10/097,574, filed on Mar. 15, 2002, now Pat. No. 6,961,041.

(30) Foreign Application Priority Data

Mar. 15, 2001    (JP) .............................. 2001-073289

(51) Int. Cl.
G09G 3/36    (2006.01)
G09G 5/00    (2006.01)

(52) U.S. Cl. ........................... 345/90; 345/87; 345/96; 345/209; 345/210; 345/212; 345/214

(58) Field of Classification Search ........... 345/87–104, 345/204–215, 690–699
See application file for complete search history.

(56) References Cited

U.S. PATENT DOCUMENTS

| | | | |
|---|---|---|---|
| 4,393,380 | A | 7/1983 | Hosokawa |
| 4,660,030 | A | 4/1987 | Maezawa |
| 5,296,847 | A | 3/1994 | Takeda et al. |
| 6,008,801 | A | 12/1999 | Jeong |
| 6,556,265 | B1 | 4/2003 | Murade |
| 6,590,552 | B1 | 7/2003 | Yokoyama et al. |
| 6,700,562 | B1 | 3/2004 | Knapp et al. |

(Continued)

FOREIGN PATENT DOCUMENTS

EP    0 622 655    11/1994

(Continued)

*Primary Examiner*—Vijay Shankar
(74) *Attorney, Agent, or Firm*—Antonelli, Terry, Stout & Kraus, LLP.

(57) ABSTRACT

A liquid crystal display device which includes a first substrate, a second substrate, a liquid crystal composition sandwiched between the first substrate and the second substrate, and a plurality of pixels disposed on the first substrate. Each of the plurality of pixels is supplied with a video signal via a switching element. Each of the plurality of pixels is provided with a capacitance having two electrodes in which one is connected to a first electrode of a corresponding one of the plurality of pixels and another is supplied with a pixel-potential control signal by a pixel-potential control circuit. The pixel-potential control circuit enables selection of a first voltage level and a second voltage level.

4 Claims, 20 Drawing Sheets

U.S. PATENT DOCUMENTS 6,961,041 B2 * 11/2005 Iida et al. .................. 345/90

FOREIGN PATENT DOCUMENTS

| JP | 61-26074 | 2/1986 |
| JP | 63-299161 | 12/1988 |
| JP | 5-143021 | 6/1993 |
| JP | 08-262494 | 10/1996 |
| JP | 10-214066 | 8/1998 |
| JP | 10-282524 | 10/1998 |
| KR | 1996-35088 | 10/1996 |
| WO | WO99/47972 | 9/1999 |

* cited by examiner

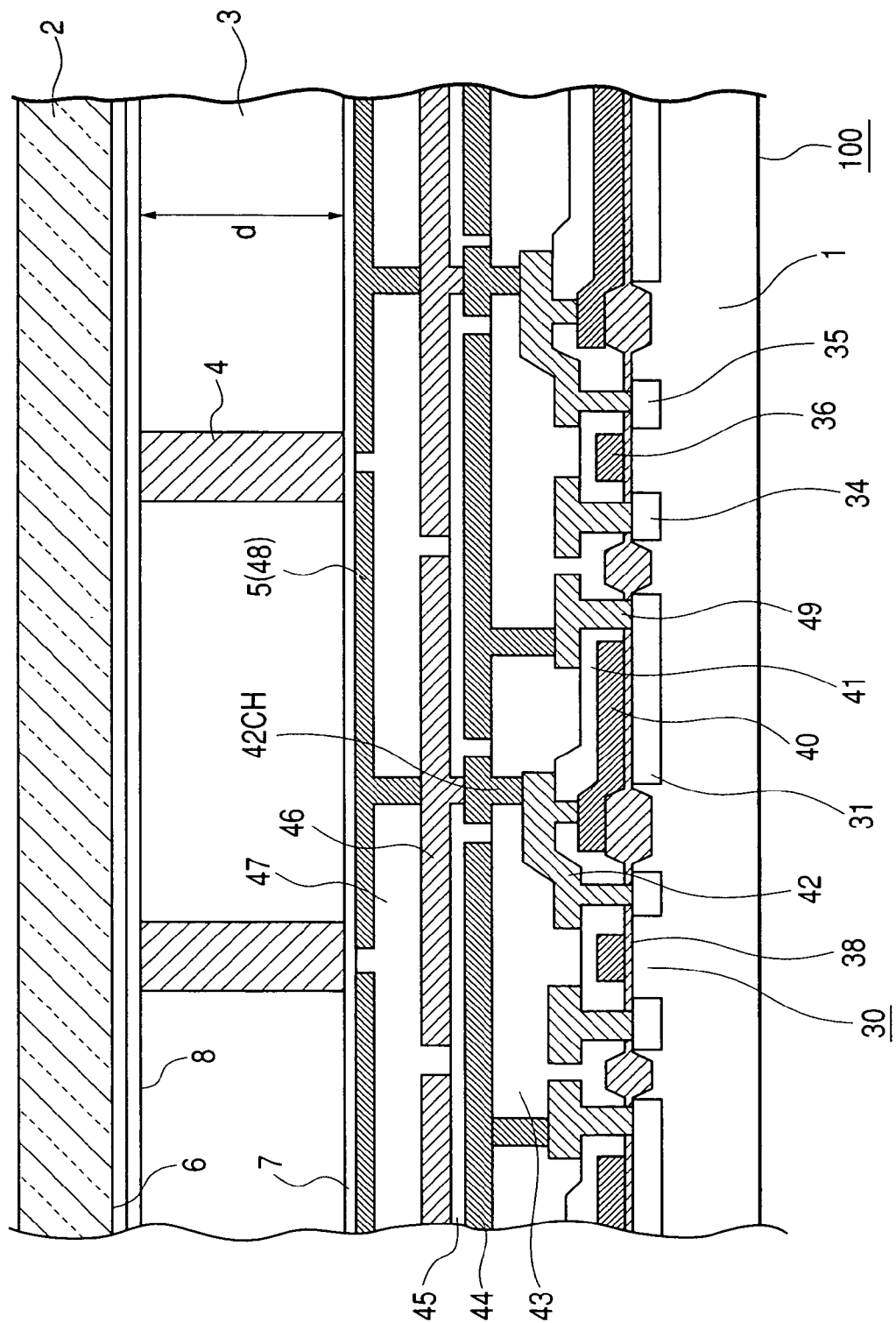

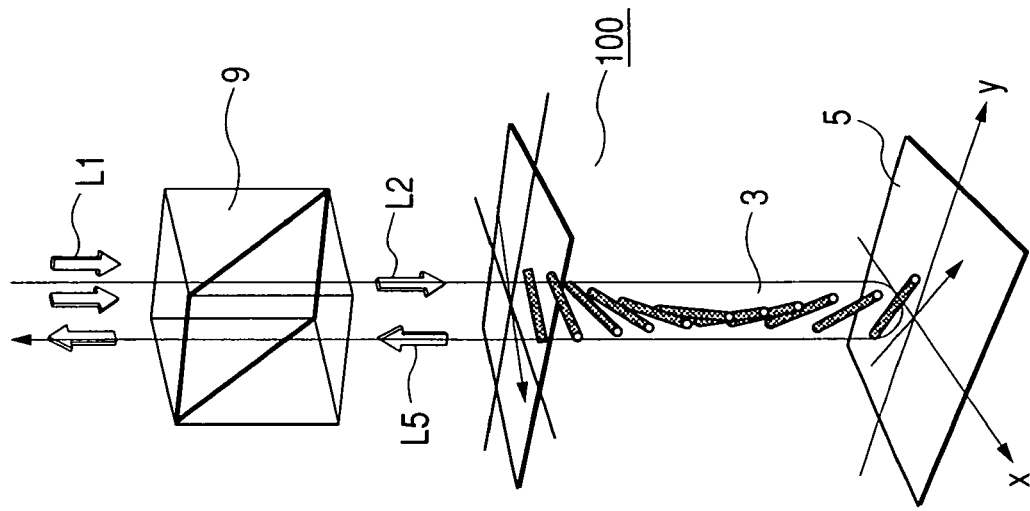
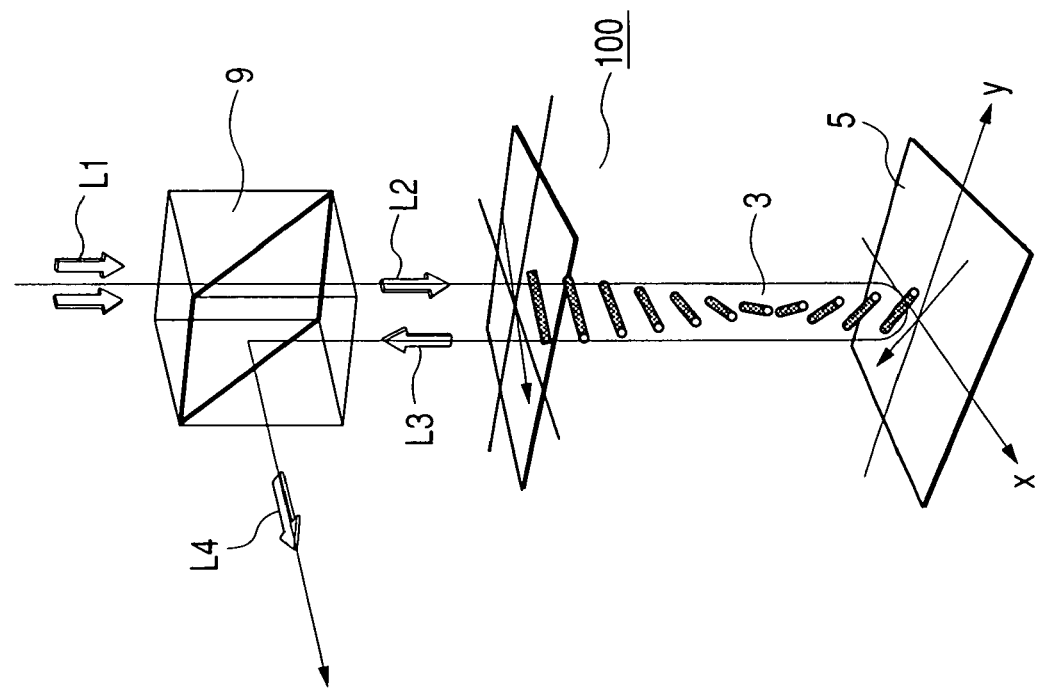

LIQUID CRYSTAL DISPLAY DEVICE HAVING A LOW-VOLTAGE DRIVING CIRCUIT

CROSS REFERENCE TO RELATED APPLICATION

This application is a continuation of U.S. application Ser. No. 10/097,574, filed Mar. 15, 2002 now U.S Pat. No. 6,961,041, the contents of which are incorporated herein by reference.

BACKGROUND OF THE INVENTION

This invention relates a liquid crystal display device, and more particularly to a technique useful for a circuit for supplying a video signal voltage to each pixel. Recently, liquid crystal display devices have been widely used in small-sized display devices, display terminals for office automation equipment and the like. Basically, a liquid crystal display device includes a liquid crystal display panel (also called a liquid crystal display element or a liquid crystal cell) composed of a pair of insulating substrates at least one of which is made of a transparent plate, a transparent plastic plate or the like, and a layer of liquid crystal composition (a liquid crystal layer) sandwiched between the insulating substrates.

The liquid crystal display devices are divided roughly into the simple-matrix type and the active matrix type. In the simple-matrix type liquid crystal display device, a picture element (hereinafter a pixel) is formed by selectively applying voltages to pixel-forming strip electrodes formed on both of the two insulating substrates of the liquid crystal display panel, and thereby changing orientation of a portion of liquid crystal molecules of the liquid crystal composition corresponding to the pixel. On the other hand, in the active-matrix type liquid crystal display device, the liquid crystal display panel is provided with signal lines, scanning lines, pixel electrodes, and active elements each associated with one of the pixel electrodes for pixel selection which are formed on one of the substrates, and a pixel is formed by selecting the active element associated with the pixel and thereby changing orientation of liquid crystal molecules present between a pixel electrode connected to the active element and the reference voltage electrode associated with the pixel electrode.

The liquid crystal display device of the active matrix type having an active element (a thin film transistor, for example) for each of pixels and switching the active elements is widely used as a display device for notebook personal computers and the like. Among the liquid crystal display devices of the active matrix type, a liquid crystal display device of the so-called driver-circuit-integrated type is known which has a pixel-electrode-driver circuit fabricated on a substrate on which the pixel electrodes are fabricated. The liquid crystal display devices are operated by AC driving which inverts the polarity of a voltage applied across the liquid crystal layer periodically. The object of the AC driving is to prevent deterioration of the liquid crystal composition caused by DC voltage application across the liquid crystal layer.

For the active matrix type liquid crystal display device which applies voltages between the pixel electrodes and the reference electrode, one of the AC driving methods is such that a fixed voltage is applied on the reference electrode and the pixel electrodes are supplied alternately with positive-polarity and negative-polarity signal voltages. However, in the above AC driving method, the driver circuit needs to be a high-voltage circuit capable of withstanding a voltage difference between the maximum positive value and the maximum negative value of the pixel electrode voltage. A control signal (a scanning signal) for on-or-off control of the thin film transistors also need to be a high voltage.

Recently, the number of steps of a gray scale displayed in the liquid crystal display devices has been increasing to 64 or 256. There is also demand for high-definition liquid crystal display devices having a larger number of pixels. When the number of steps of a gray scale to be displayed, the circuit becomes large in scale, and when the number of pixels is increased, the driving circuit for supplying signals to the respective pixels is operated at high speed, and an area which each of the pixels can occupy is reduced. On the other hand, in high-voltage circuits it is difficult to miniaturize their circuit elements, and as a result the scale of the circuits becomes larger. Especially in small-sized liquid crystal display panels, even when there is a demand for an increase in the number of pixels, it has been difficult to fabricate a structure such as a high-voltage active element within a limited area of each pixel. Further, in a liquid crystal display device of the driver-circuit-integrated type having a driver circuit incorporated into its liquid crystal display panel, a problem arises in that since the area occupied by the driver circuit increases, the liquid crystal display panel becomes large-sized. Moreover, in the high-voltage circuit, there is a problem in that, because the area of its electrodes and others are increased, the resultant increase in their capacitive components makes it difficult to operate the driver circuit at high speed, and also increases its power consumption.

SUMMARY OF THE INVENTION

The present invention has been made to solve the above problems with the prior art, and provides a technique capable of high-speed operation of the liquid crystal display device by making possible the AC driving with a low-voltage drive circuit and reduction of the size of pixels and the scale of the drive circuit.

The above-mentioned objects and novel features of the present invention will become apparent with reference to the description of the specification and the accompanying drawings.

The following explains the representative ones of the present inventions briefly. In accordance with an embodiment of the present invention, there is provided a liquid crystal display comprising a first substrate, a second substrate, a liquid crystal composition sandwiched between the first substrate and the second substrate, a plurality of pixels disposed on the first substrate, each of the plurality of pixels being supplied with a video signal via a switching element connected to a first electrode thereof, each of the plurality of pixels being provided with a capacitance, one of two capacitance-forming electrodes forming the capacitance being connected to the first electrode of a corresponding one of the plurality of pixels, and another of the two capacitance-forming electrodes being supplied with a pixel-potential control signal, wherein polarity of the video signal reverses with respect to a first reference voltage with a repetition period, and the pixel-potential control signal alternates between two voltage levels of same polarity with respect to a second reference voltage such that a voltage swing on the first electrodes of the plurality of pixels becomes larger than that of the video signal.

In accordance with another embodiment of the present invention, there is provided a liquid crystal display device comprising a first substrate, a second substrate, a liquid crystal composition sandwiched been the first substrate and the second substrate, a plurality of pixels disposed on the first substrate, each of the plurality of pixels being supplied with a video signal via a switching element connected to a first electrode thereof, each of the plurality of pixels being provided with a capacitance, one of two capacitance-forming electrodes forming the capacitance being connected to the first electrode of a corresponding one of the plurality of pixels, another of the two capacitance-forming electrodes being supplied with a pixel-potential control signal, and light-blocking films interposed between electrodes forming the plurality of pixels on the first substrate, wherein polarity of the video signal reverses with respect to a first reference voltage with a repetition period, the pixel-potential control signal alternates between two voltage levels of same polarity with respect to a second reference voltage such that a voltage swing on the first electrodes of the plurality of pixels becomes larger than that of the video signal, and the pixel-potential control signal is provided via a corresponding one of the light-blocking films.

In accordance with another embodiment of the present invention, there is provided a liquid crystal display device comprising a first substrate, a second substrate, a liquid crystal composition sandwiched between the first substrate and the second substrate, a plurality of pixels disposed on the first substrate, each of the plurality of pixels being supplied with a video signal via a switching element connected to a pixel electrode thereof, each of the plurality of pixels having a pixel capacitance and a liquid crystal capacitance, one of two pixel-capacitance-forming electrodes forming the pixel capacitance being connected to the pixel electrode of a corresponding one of the plurality of pixels, another of the two pixel-capacitance-forming electrodes being supplied with a pixel-potential control signal, one of two liquid-crystal-capacitance-forming electrodes forming the liquid crystal capacitance being the pixel electrode of the corresponding one of the plurality of pixels, and another of the two liquid-crystal-capacitance-forming electrodes being supplied with a first reference voltage, wherein the video signal swings between two voltage levels of same polarity with respect to a second reference voltage, and the pixel-potential control signal changes from a first voltage level to a second voltage level such that a voltage on the pixel electrode is reversed in polarity with respect to the first reference voltage.

BRIEF DESCRIPTION OF THE DRAWINGS

In the accompanying drawings, in which like reference numerals designate similar components throughout the figures, and in which:

FIG. 7 is a schematic cross sectional view of a pixel section in a liquid crystal display device in accordance with an embodiment of the present invention;

FIGS. 13A and 13B are perspective vies of a liquid crystal display device in accordance with an embodiment of the present invention for explaining its operation;

DETAILED DESCRIPTION OF THE PREFERRED EMBODIMENTS

Figure 1:
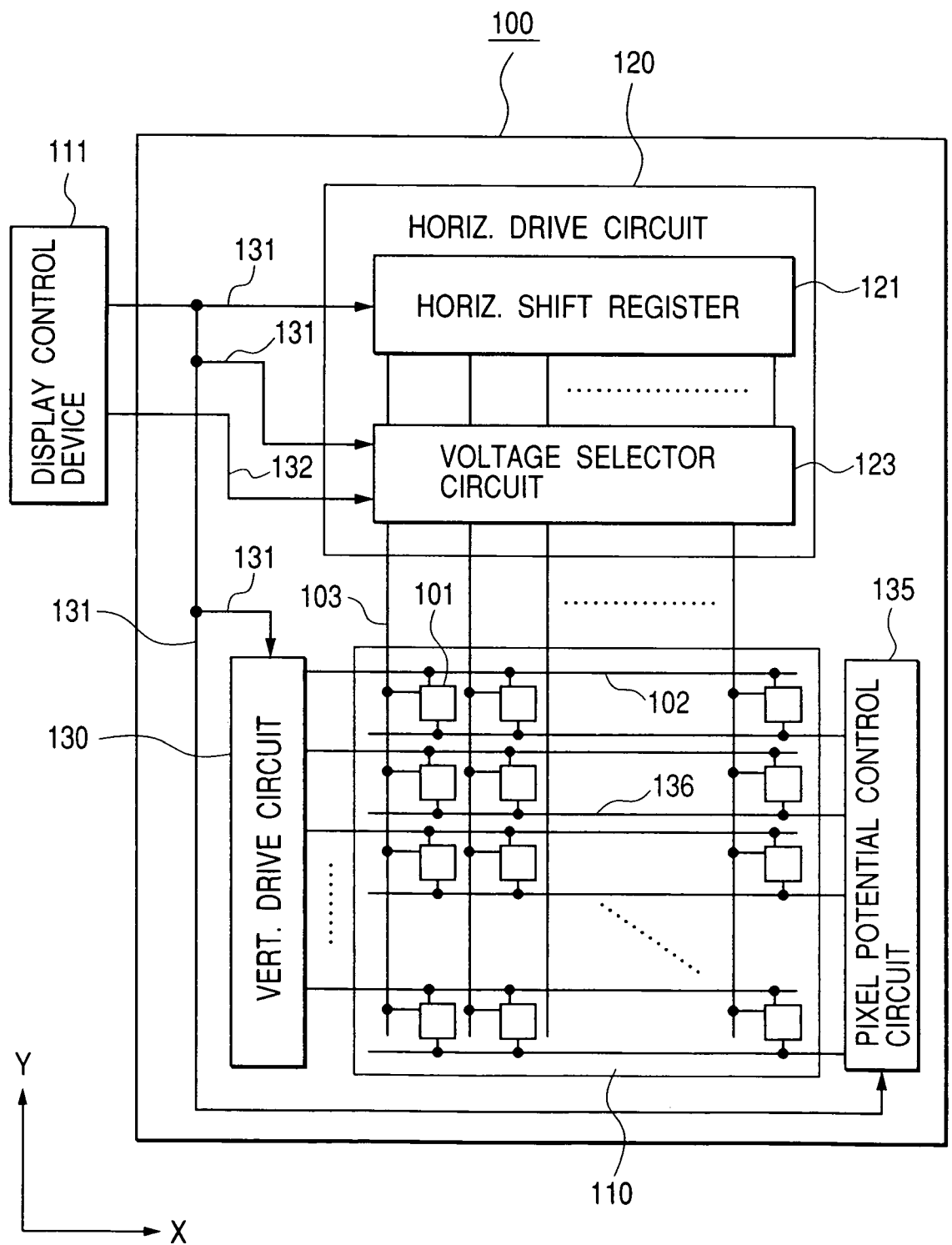
FIG. 1 is a block diagram for illustrating a rough overall structure of a liquid crystal display device in accordance with an embodiment of the present invention.

The following describes the embodiments in accordance with the present invention in detail by reference to the drawings. Same reference numerals designate functionally similar parts throughout the figures for explaining the embodiments of the present invention, and they are not repeatedly explained.

FIG. 1 is a block diagram for illustrating a rough overall structure of a liquid crystal display device in accordance with an embodiment of the present invention. The liquid crystal display device of the present embodiment comprises a liquid crystal display panel (a liquid crystal display element) 100 and a display control device 111.

The liquid crystal display panel 100 comprises a display section 110 having pixel sections 101 arranged in a matrix fashion, a horizontal drive circuit (a video signal line drive circuit) 120, a vertical drive circuit (a scanning signal line drive circuit) 130, and a pixel-potential control circuit 135. The display section 110, the horizontal drive circuit 120, the vertical drive circuit 130, and the pixel-potential control circuit 135 are disposed on the same substrate.

The display control device 111 controls the horizontal drive circuit 120, the vertical drive circuit 130, and the pixel-potential control circuit 135, based upon control signals such as clock signals, a display timing signal, a horizontal sync signal, a vertical sync signal, which are externally transmitted. The display control device 111 supplies display data to be displayed on the liquid crystal display panel 100, to the horizontal drive circuit 120. Reference numeral 131 denote control signal lines from the display control device 111, and 132 is a display signal line.

A plurality of video signal lines (also called drain signal lines or vertical signal lines) 103 extend from the horizontal drive circuit 120 in a vertical direction (in the Y direction in FIG. 1) into the display section 110, and they are arranged in a horizontal direction (in the X direction in FIG. 1). A plurality of scanning signal lines (also called gate signal lines or horizontal signal lines) 102 extend from the vertical drive circuit 130 in the horizontal direction (in the X direction in FIG. 1), and they are arranged in the vertical direction (in the Y direction in FIG. 1). A plurality of pixel-potential control line 136 extend from the pixel-potential control circuit 135 in the horizontal direction (in the X direction), and are arranged in the vertical direction (in the Y direction).

The horizontal drive circuit 120 comprises a horizontal shift register 121 and a voltage selector circuit 123. The control signal lines 131 and the display signal line 132 from the display control device 111 is connected to the horizontal shift register 121 and a voltage selector circuit 123 for supplying control signals and display signals. Here display data in both digital and analog forms.

For simplicity, voltage supply lines to the respective circuits are omitted from FIG. 1, but it is to be understood that necessary supply voltages are provided to the respective circuits.

When the display control device 111 receives the first display timing signal immediately after receiving an externally supplied vertical sync signal, the display control device 111 outputs a start pulse to the vertical drive circuit 130 via the control signal line 131. Then the display control device 111 outputs shift clocks to the vertical drive circuit 130 with a horizontal scanning pod (hereinafter referred to as 1 h) based upon the horizontal sync pulses so that the scanning signal lines 102 are selected sequentially. The vertical drive circuit 130 selects the scanning signal lines 102 based upon the shift clocks and supplies the scanning signals to the selected scanning signal lines 102. That is to say, the vertical drive circuit 130 outputs signals to select the scanning signal lines 102 for one horizontal scanning period 1 h, line by line, from top to bottom, in FIG. 1.

Further, when the display control device 111 receives a display timing signal, the display control device 111 acknowledges the display timing signal as corresponding to a display start, and outputs display data to the horizontal drive circuit 120. Display data are output sequentially from the display control device 111, and the horizontal shift register 121 outputs timing signals based upon the shift clocks transmitted from the display control device 111. The timing signals indicate times at which the voltage selector circuit 123 takes in display data to be supplied to the respective video signal lines 103.

When display signals are in analog form, the voltage selector circuit 123 takes in corresponding levels as display data (gray scale voltages) from the analog signals in synchronism with the timing signals, and then outputs the taken-in gray scale voltages to the video signal lines 103 as video signals. On the other hand, when display data are in digital form, the voltage selector circuit 123 takes in the display signals in synchronism with the timing signals, and then selects (decodes) gray scale voltages in accordance with the display signals (the digital data), and then outputs the gray scale voltages to the video signal lines 103. The gray scale voltages output to the video signal lines 103 are written into the pixel electrodes of the pixel sections 101 as the video signals in synchronism with the scanning signals from the vertical drive circuit 130.

The pixel-potential control circuit 135 controls the video signal voltages written into the pixel electrodes in accordance with the control signals from the display control device 111. The gray scale voltages written into the pixel electrodes via the video signal lines 103 have some voltage difference with respect to the reference voltage on the counter electrode. The pixel-potential control circuit 135 varies the voltage difference between the pixel electrodes and the counter electrode by supplying a control signal to the pixel selections 101. The detail of the pixel-potential control circuit 135 will be explained subsequently.

Figure 2:
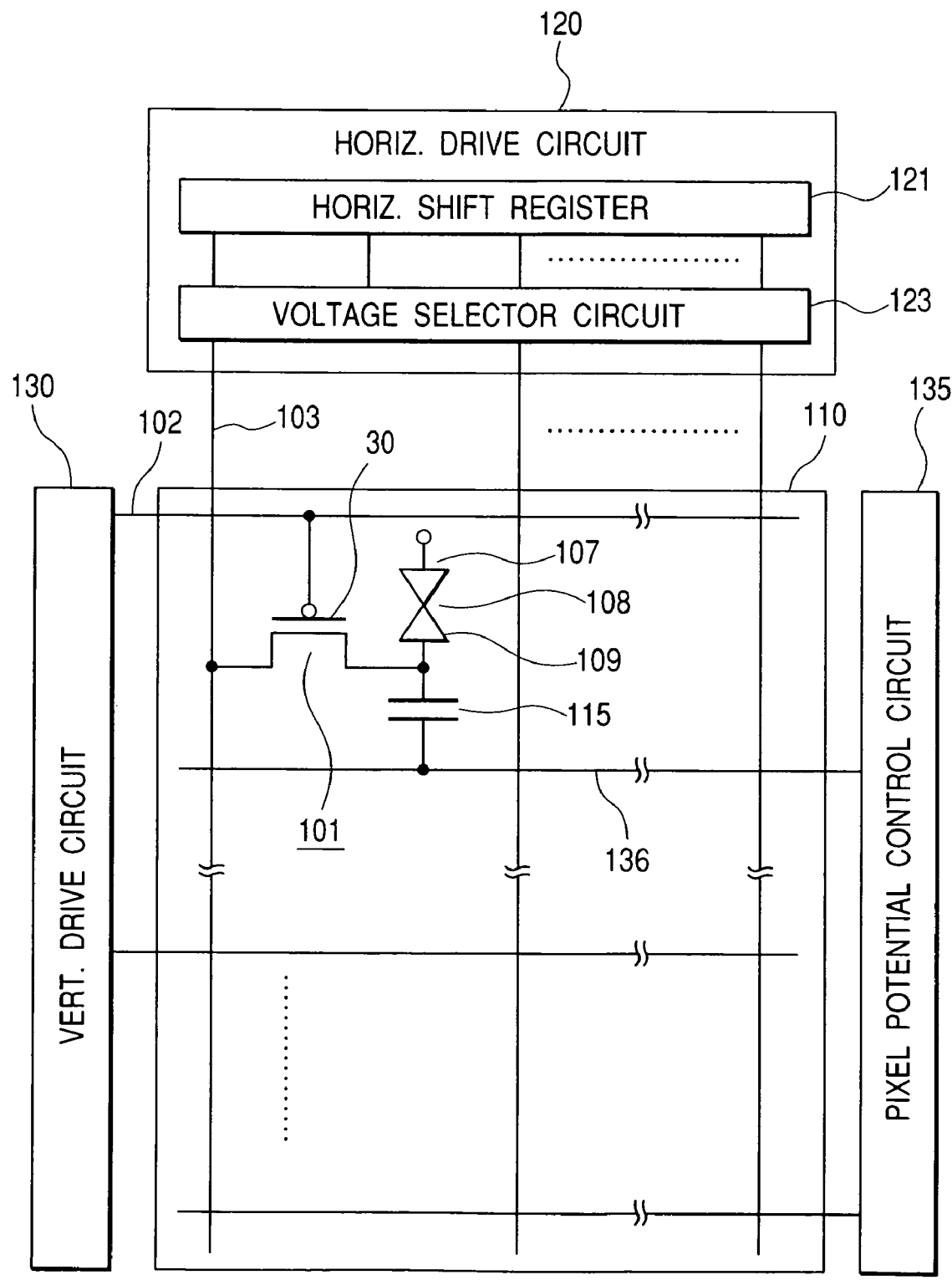
FIG. 2 is a block diagram illustrating an example of a liquid crystal panel in accordance with an embodiment of the present invention.

The pixel section 101 in the liquid crystal display panel 100 in an embodiment of the present invention will be explained by reference to FIG. 2. FIG. 2 illustrates an equivalent circuit of the pixel section 101. Each of the pixels 101 is disposed in an area surrounded by two adjacent ones of the scanning signal lines 102 and two adjacent ones of the video signal lines 103 in the display section 110, and the pixels 101 are arranged in a matrix fashion. For simplicity, only one of the pixel sections 101 is depicted in FIG. 2. Each of the pixel sections 101 has an active element 30 and a pixel electrode 109. The pixel electrode 109 is connected to a pixel capacitance 115. One electrode of the pixel capacitance 115 is connected to the pixel electrode 109, and the other electrode of the pixel capacitance 115 is connected to the pixel-potential control line 136 which in turn is connected to the pixel-potential control circuit 135. In FIG. 2, the active element 30 is illustrated as the p-channel type transistor.

As described above, the vertical drive circuit 130 outputs the scanning signals sequentially to the scanning signal lines 102, and the scanning signals are used for on-or-off control of the active elements 30. The video signal lines 103 are supplied with the gray-scale voltages as the video signals, and when the active elements 30 are turned on, the grayscale voltages are supplied to the pixel electrodes 109 from the video signal lines 103. A counter electrode (a common electrode) 107 is disposed to face the pixel electrodes 109, and a liquid crystal layer (not shown) is interposed between the pixel electrodes 109 and the counter electrode 107. In the circuit diagram shown in FIG. 2, an equivalent liquid crystal capacitance 108 due to the liquid crystal layer is illustrated as connected between one of the pixel electrode 109 and the counter electrode 107. A display is produced by applying voltages between the pixel electrodes 109 and the counter electrode 107, thereby changing the direction of orientation of liquid crystal molecules and by utilizing resultant changes in optical properties of the liquid crystal layer.

For a method of driving the liquid crystal display device, as described above, the AC driving is employed so as to avoid application of a DC voltage across the liquid crystal layer. For the AC driving, if a voltage on the counter electrode 107 is taken as a reference voltage, the voltage selector circuit 123 outputs two voltages of positive and negative polarities with respect to the reference voltage, as gray scale voltages. However, if the voltage selector circuit 123 is configured to be high-voltage circuit capable of withstanding a voltage difference between the two voltages of the positive and negative polarities, problems arise in that the scale of circuit elements such as the active elements 30 becomes larger and the speed of operation is decreased.

In view of the above problems, an AC driving was studied which is capable of utilizing signals of the same polarity with respect to the reference voltage, as video voltages to be supplied to the pixel electrodes 109 from the voltage selector circuit 123. As an example, suppose that the voltage selector circuit 123 outputs a voltage of positive polarity with the reference voltage. Initially the voltage of the positive polarity with respect to the reference voltage is written into the pixel electrode, and then by lowering a voltage of a pixel-potential control signal supplied to the electrode of the pixel capacitance 115 by the pixel-potential control circuit 135, and thereby lowering the voltage of the pixel electrode 109, the voltage of negative polarity with respect to the reference voltage is obtained.

When the above driving method is employed, the voltage difference between the maximum and minimum values of the voltages to be supplied by the voltage selector circuit 123 becomes smaller, and as a result the voltage selector circuit 123 can be configured as a low-voltage circuit In the above example, initially the voltage of positive polarity is written into the pixel electrode 109, then the voltage of negative polarity is produced by using the pixel-potential control circuit 135. However, this relationship can be reversed. Initially the voltage of negative polarity is written into the pixel electrode 109, then the voltage of positive polarity can be produced by raising the voltage of the pixel-potential control signal from the pixel-potential control circuit 135.

Figure 3A:
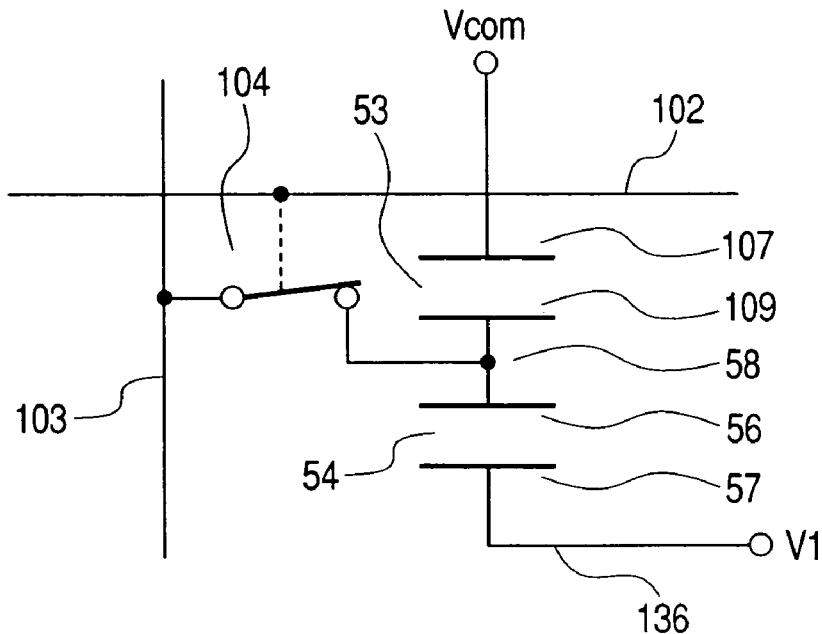
FIGS. 3A and 3B are schematic circuit diagrams for explaining a method of controlling a pixel potential.
Figure 3B:
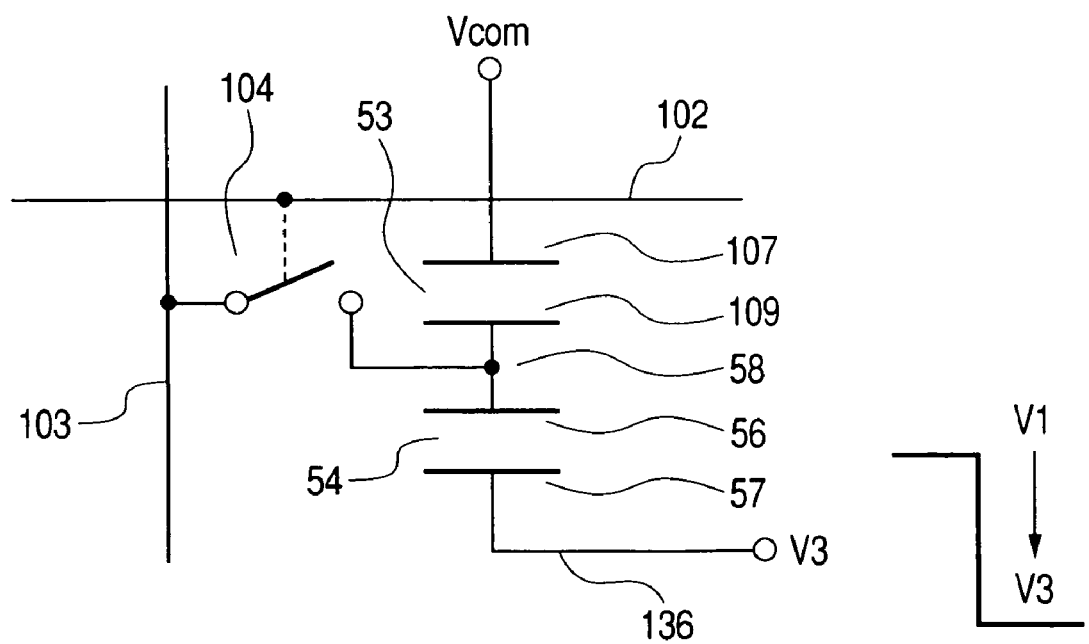

A method of varying the voltage on the pixel electrode 109 will be explained by reference to FIGS. 3A and 3B. In FIGS. 3A and 3B, for purpose of illustration, the liquid crystal capacitance 108 and the pixel capacitance 115 are represented by a first capacitor 53 and a second capacitor 54, respectively, and the active element 30 is represented by a switch 104. Reference numeral 56 denotes one electrode of the pixel capacitance 115 connected to the pixel electrode 109, and 57 is the other electrode of the pixel capacitance 115 connected to the pixel-potential control line 136. A junction point between the pixel electrode 109 and the electrode 56 is indicated by a node 58. For simplicity, assuming that other parasitic capacitances can be neglected, the capacitances of the first capacitor 53 and the second capacitor 54 are CL and CC, respectively.

Initially, as shown in FIG. 3A, the electrode 57 of the second capacitor 54 is externally supplied with a voltage V1. Thereafter, when the switch 104 is turned ON by a scanning signal, a voltage is supplied to the pixel electrode 109 and the electrode 56 from the video signal line 103. Here, the voltage supplied to the node 58 is assumed to be V2.

Then, as shown in FIG. 3B, at a time the switch 104 is turned OFF, the voltage applied to the electrode 57, the pixel-potential control signal, is lowered from the voltage V1 to a voltage V3. Since the total amount of electric charges stored in the first and second capacitors 53 and 54 remains unchanged, the voltage at the node 58 changes to V2−{CC/(CL+CC)}×(V1−V3).

Here, if the capacitance CL of the first capacitor 53 is sufficiently small compared with the capacitance CC of the second capacitor 54, i.e., when CL<<CC, then CC/(CL+CC) ≈1, and thereby the voltage at the node 58 becomes equal to V2−V1+V3. If V2=0 and V3=0, the voltage at the node 58 becomes equal to (−V1).

By using the above-explained method, initially a voltage supplied to the pixel electrode 109 from the video signal line 103 is selected to be positive with respect to the reference voltage on the counter electrode 107, and thereafter a negative-polarity signal can be produced by controlling a voltage applied on the electrode 57, i.e., the pixel-potential control signal. When the negative-polarity signal is produced in this way, it is not necessary to supply negative-polarity signals from the voltage selector circuit 123, and thereby the peripheral circuits can be formed by using low voltage circuit elements.

Operating timing in the circuit shown in FIG. 2 will be explained by reference to FIG. 4. "1V" in FIG. 4 indicates a vertical scanning period. .1 denotes a gray scale voltage supplied to the video signal line 103, .2 is a scanning signal supplied to the scanning signal line 102, .3 is a pixel-potential control signal (a voltage-dropping signal) supplied to the pixel-potential control signal line 136, and .4 is a potential of the pixel electrode 109. The pixel-potential control signal .3 swings between the voltages V3 and V1 as indicated in FIGS. 3A and 3B.

Figure 4:
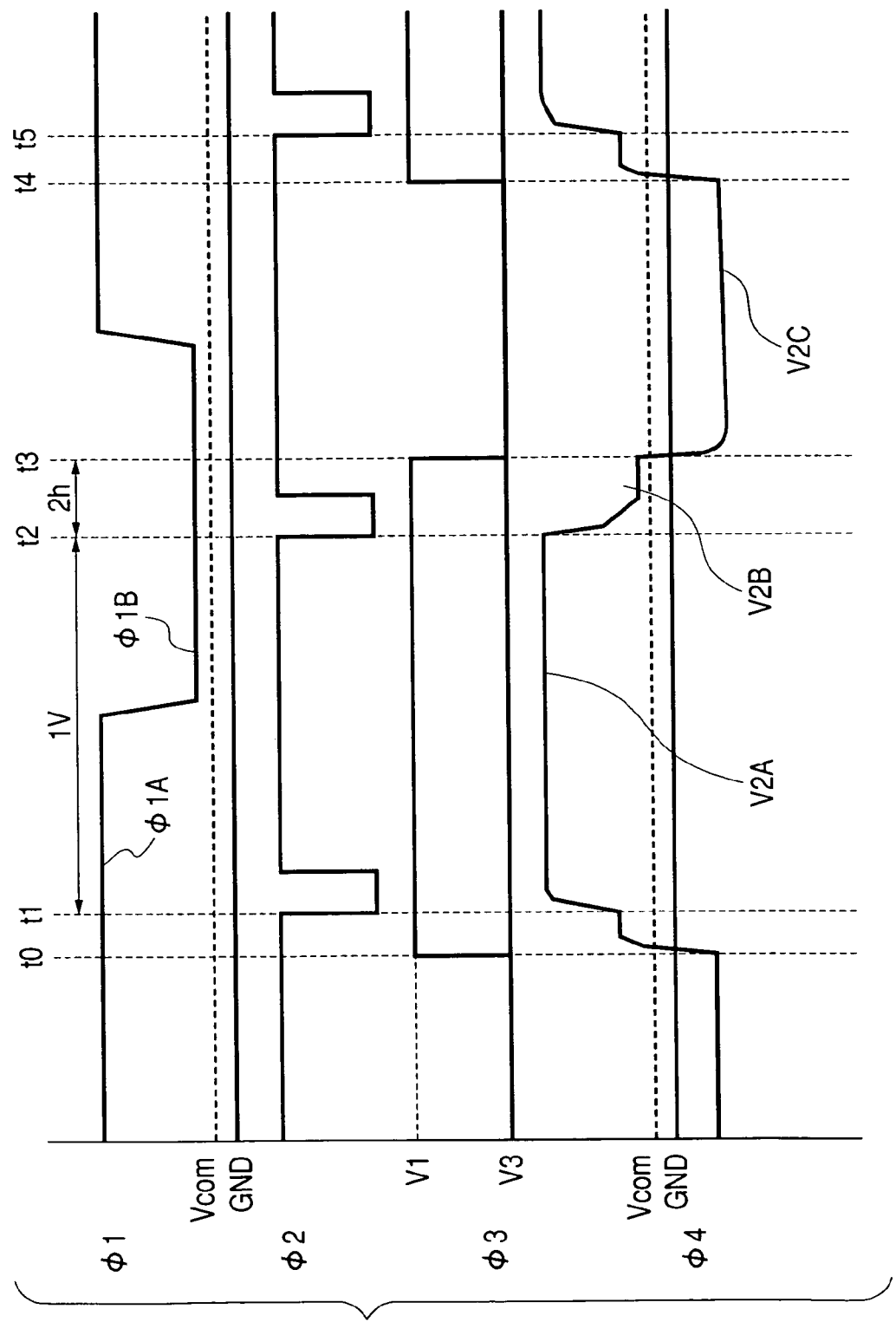
FIG. 4 is a timing cat for explaining the method of driving the liquid crystal display panel shown in FIG. 2.

FIG. 4 illustrates a case in which the gray scale voltage .1 is composed of a positive-polarity-voltage-input signal .1A and a negative-polarity-voltage-input signal .1B. The positive-polarity-voltage-input signal .1A is applied to a pixel electrode, and is left as it is. On the other hand, the negative-polarity-voltage-input signal .1B is initially applied to the pixel electrode, and then is converted into a voltage of polarity negative with respect to a reference voltage Vcom by using the pixel-potential control signal .3. In this embodiment, a case is assumed in which both the positive-polarity-voltage-input signal .1A and the negative-polarity-voltage-input signal .1B are positive with respect to the reference voltage Vcom applied to the counter electrode 107.

In FIG. 4, during time from t0 to t2, the gray scale voltage .1 is the positive-polarity-voltage-input signal .1A. Initially, at the time t0, the pixel-potential control circuit 135 outputs the voltage V1 as the pixel-potential control signal .3, then, at time t1 when the scanning signal .2 changes to a low level corresponding to a selected state, the p-channel type transistor 30 indicated in FIG. 2 is turned OFF, and thereby the positive-polarity-voltage-input signal .1A on the video signal line 103 is written into the pixel electrode 109. The signal written into the pixel electrode 109 is represented by .4 in FIG. 4. The voltage written into the pixel electrode 109 at the time t1 is represented by V2A in FIG. 4. Next, when the scanning signal .2 changes to a high level corresponding to a non-selected state, the transistor 30 is turned OFF, and thereby the pixel electrode 109 is cut off from the video signal line 103 for supplying a voltage thereto. The liquid crystal display device displays a gray scale level based upon the voltage V2A written into the pixel electrode 109.

Time from t2 to t4 will be explained when the gray scale voltage is .1 is the negative-polarity-voltage-input signal .1B. At the time t2, the scanning signal .2 is output, and thereby a voltage V2B represented in .4 is written into the pixel electrode 109. Thereafter, the transistor 30 is turned OFF, and at time t3, after a time of 2 h (two horizontal scanning periods) from the time t2, the voltage supplied to the pixel capacitance 115 (see FIG. 2) is dropped from V1 to V3 as represented in the pixel-potential control signal .3 of FIG. 4. When the pixel-potential control signal .3 is changed from V1 to V3, since the pixel capacitance 115 serves as a coupling capacitance, the potential of the pixel electrode 109 can be dropped by the amount based upon the amplitude of the pixel-potential control signal .3. Thus a voltage V2C of polarity negative with respect to the reference voltage Vcom is produced within the pixel.

When the negative-polarity signal is produced by using the above-described method, the peripheral circuits can be formed by using law voltage circuit elements. The signals output from the voltage selector circuit 123 are small-amplitude positive signals, and therefore it makes possible to fabricate the voltage selector circuit 123 as low-voltage circuits. When the voltage selector circuit 123 can be operated at low voltages, since other peripheral circuits such as the horizontal shift register 120 and the display control device 111 are lad voltage circuits, the whole circuit of the liquid crystal display device can be fabricated as a low-voltage circuit.

Figure 5:
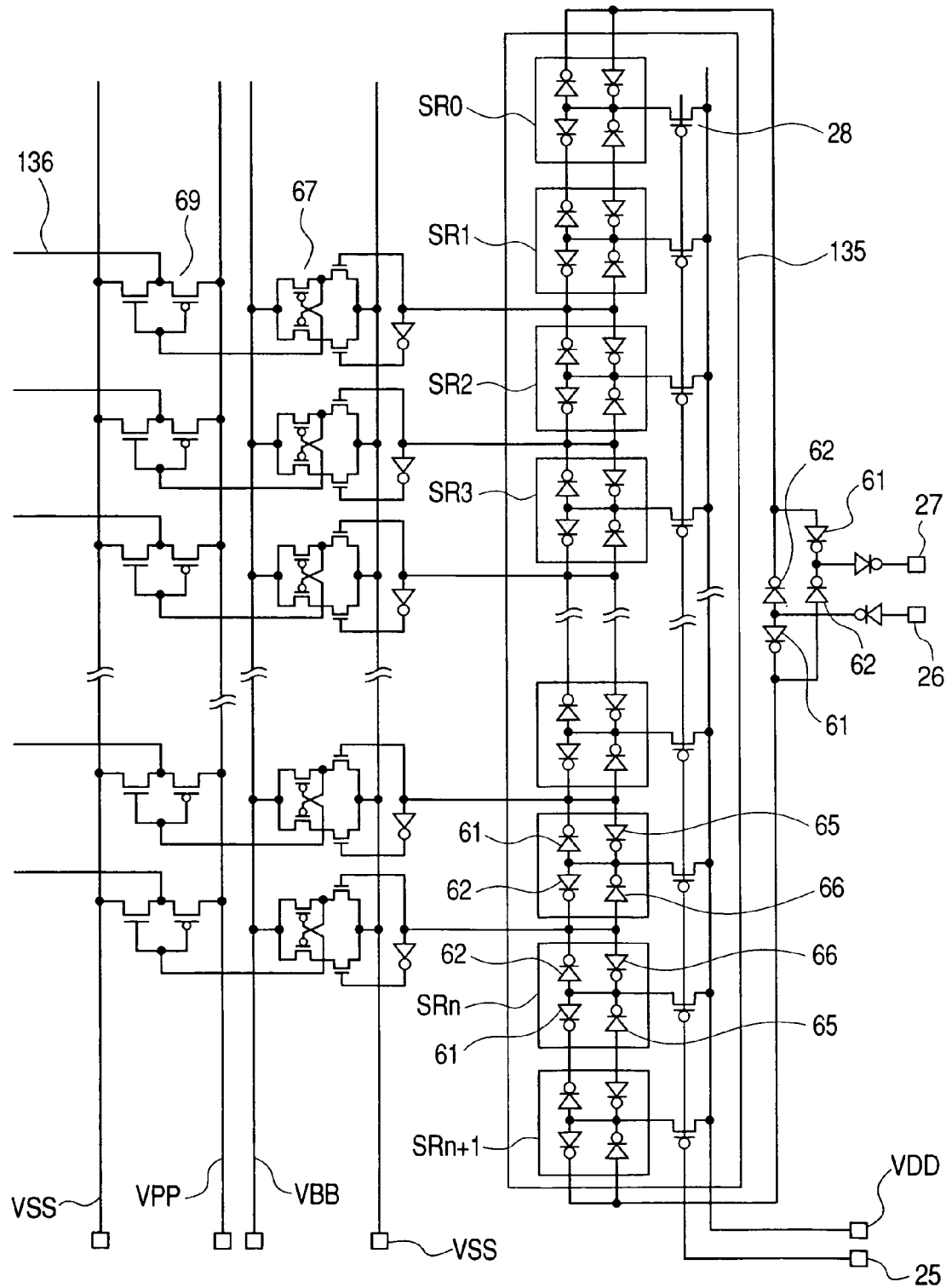
FIG. 5 is a schematic circuit diagram for illustrating a pixel-potential control circuit.

FIG. 5 illustrates a circuit configuration of the pixel-potential control circuit 135. Reference characters SR1–SRn+1 (hereinafter the suffixes will be omitted unless they should be distinguished from each other) denote bidirectional shift registers which can shift a signal upward and downward. Each of the bidirectional shift registers SR is composed of clocked inverters 61, 62, 65 and 66. Reference numeral 67 denote level shifters, and 69 are output circuits. The circuits such as the bidirectional shift registers SR operate from a supply voltage VDD. The level shifters 67 convert the voltage level of the signals output from the bidirectional shift registers SR. The level shifters 67 output a signal having an amplitude between a supply voltage VBB which is higher than the supply voltage VDD and a supply voltage VSS (a ground potential). The output circuits 69 are supplied with a supply voltage VPP and the supply voltage VSS, and output the voltage VPP or VSS to the pixel-potential control line 136 in accordance with the signal from the level shifter 67. In the pixel-potential control signal .3 explained in connection with FIG. 4, the voltages V1 and V3 correspond to the supply voltage VPP and the supply voltage VSS, respectively. In FIG. 5, the output circuits 69 are represented as inverters composed of p-channel type and flannel type transistors. The supply voltage VPP supplied to the p-channel type transistor and the supply voltage VSS supplied to the n-channel transistor can be selected such that they can be output as the pixel-potential control signal .3. However, since the silicon substrate within which the p-channel type transistors are fabricated is supplied with a substrate voltage as explained subsequently, the supply voltage VPP needs to selected to be an appropriate value with respect to the substrate voltage. Reference numeral 26 is an input terminal for a start signal for supplying the start signal serving as one of control signals to the pixel-potential control circuit 135. The bidirectional shift registers SR1–SRn+1 shown in FIG. 5 output timing signals successively in synchronism with externally supplied clock signals after receiving the start signal. The level shifter 67 outputs the voltage VSS or VBB in accordance with the timing signals, and the output circuit 69 outputs the voltage VPP or VSS to the pixel-potential control line 136 in accordance with the output from the level shifter 67. The pixel-potential control signal .3 having desired timing relationship can be output from the pixel-potential control circuit 135 by supplying the start signal and the clock signals to the bidirectional shift registers SR to establish the timing relationship for the pixel-potential control signal .3 shown in FIG. 4. Reference numeral 25 denotes an input terminal for a reset signal.

The clocked inverters 61 and 62 employed in the bidirectional shift registers SR will be explained by reference to FIGS. 6 and 6B. Reference characters UD1 and UD2 denote first and second direction-setting lines, respectively. The first direction-setting line UD1 provides an H level for scanning in the bottom-top direction in FIG. 5, and the second direction-setting line UD2 provides an H level for scanning in the top-to-bottom direction in FIG. 5. For clarity, wiring is omitted in FIG. 5, but the first and second direction-setting lines UD1 and UD2 are connected to the clocked inverters 61 and 62 constituting the bidirectional shift register SR.

Figure 6A:
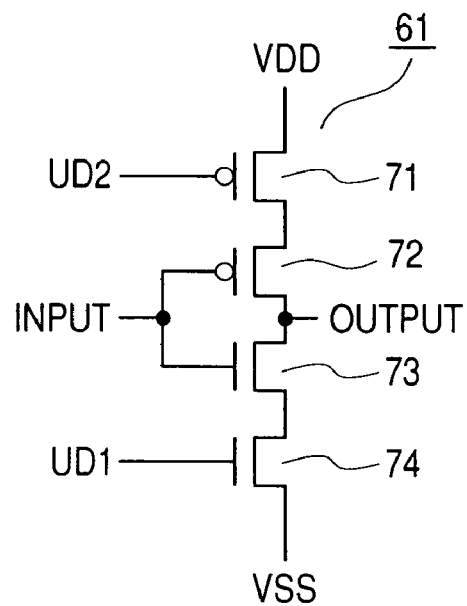
FIGS. 6A-6D are schematic circuit diagrams for illustrating clocked inverters employed in the pixel-potential control circuit.

The clocked inverter 61 is composed of p-type transistors 71, 72 and n-type transistors 73, 74 as shown in FIG. 6A. The p-type transistor 71 is connected to the second direction-setting line UD2, and the n-type transistor 74 is connected to the first direction-setting line UD1. When the first direction-setting line UD1 is at the H level and the second direction-setting line UD2 is at the L level, the clocked inverter 61 serves as an inverter, but when the second direction-setting line UD2 is at the H level and the first direction-setting line UD1 is at the L level, the clocked inverter 61 serves as a high impedance.

Figure 6B:
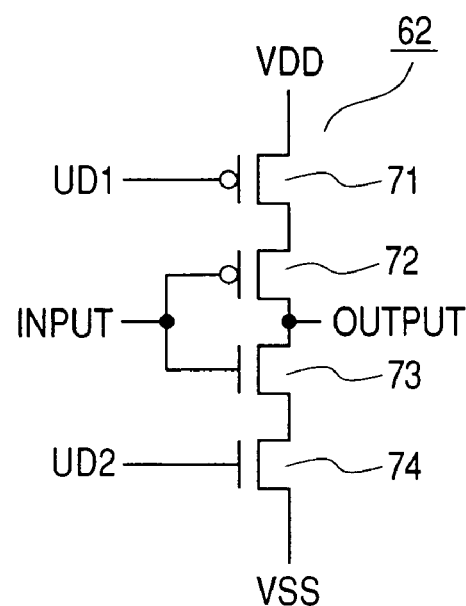

On the other hand, in the clocked inverter 62, the p-type transistor 71 is connected to the first direction-setting line UD1, and the n-type transistor 74 is connected to the second direction-setting line UD2, as shown in FIG. 6B. When the second direction-setting line UD2 is at the H level, the clocked inverter 62 serves as an inverter, and when the first direction-setting line UD1 is at the H level, the clocked inverter 62 serves a high impedance.

Figure 6C:
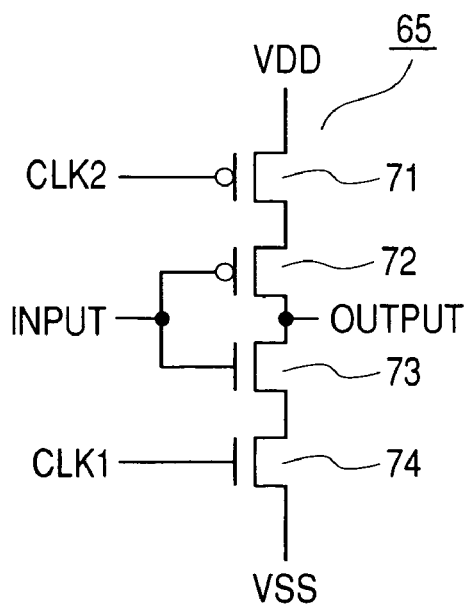

FIG. 6C illustrates a circuit configuration of the clocked inverter 65. When a clock signal line CLK1 is at the H level, and a clock signal line CLK2 is at the L level, the clocked inverter 65 outputs an inverted input, and when the clock signal line CLK1 is at the L level, and the clock signal line CLK2 is at the H level, the clocked inverter 65 serves as a high impedance.

Figure 6D:
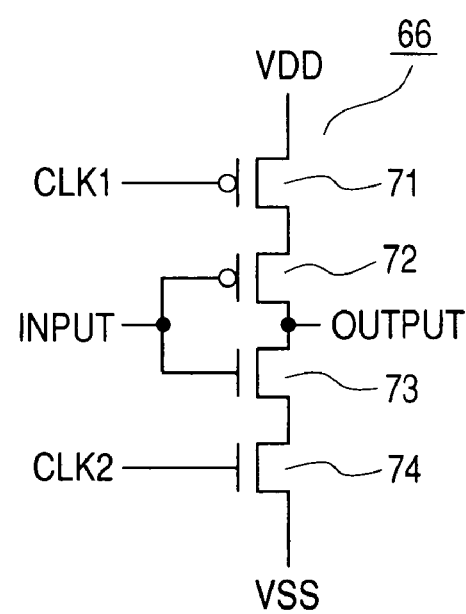

FIG. 6D illustrates a circuit configuration of the clocked inverter 66. When the clock signal line CLK2 is at the H level, and the clock signal line CLK1 is at the L level, the clocked inverter 66 outputs an inverted input, and when the clock signal line CLK2 is at the L level, and the clock signal line CLK1 is at the H level, the clocked 66 inverter serves as a high impedance. For clarity, connections of the clock signal lines CLK1, CLK2 are omitted in FIGS. 6A-D, but the clock signal lines CLK1 and CLK2 are connected to the clocked inverters 65 and 66.

As explained above, when the bidirectional shift registers are formed of the clocked inverters 61, 62, 65 and 66, the bidirectional shift registers SR can output the timing signals successively. If the pixel-potential control circuit 135 is formed by the bidirectional shift registers SR, the pixel-potential control signal .3 for the bidirectional scanning can be obtained. Since the vertical drive circuit 130 is also composed of similar bidirectional shift registers, the liquid crystal display device in accordance with the present invention is capable of bidirectional scanning of top-to-bottom and bottom-to-top directions. With this configuration, if an inverted image is desired to be displayed, scanning is performed from the bottom to the top of the display screen by reversing the scanning direction. When the vertical drive circuit 130 is set to scan the display screen from bottom to top, the pixel-potential control circuit 135 is also set to correspond to the bottom-to-top scanning by changing setting of the first and second direction-setting lines UD1 and UD2. The horizontal shift register 121 is also composed of similar bidirectional shift registers.

The following explains the pixel section in the reflective type liquid crystal display device in accordance with the present invention by reference to FIG. 7. FIG. 7 is a schematic cross-sectional view of an embodiment of the reflective type liquid crystal display device in accordance with the present invention. In FIG. 7, reference numeral 100 denotes a liquid crystal display panel, 1 is a first substrate serving as a drive circuit substrate, 2 is a second substrate serving as a transparent substrate, 3 is a liquid crystal composition, 4 are spacers. The spacers 4 establish a fixed cell gap d between the drive circuit substrate 1 and the transparent substrate 2 which sandwich the liquid crystal composition 3. Reference numeral 5 denotes reflecfive electrodes (pixel electrodes) formed on the drive circuit substrate 1, 6 is a counter electrode for applying a voltage across the liquid crystal composition 3 in cooperation with the reflective electrode 5, 7 and 8 are orientation films for orientating liquid crystal molecules of the liquid crystal composition 3 in specified directions, and 30 are active elements for applying a gray scale voltage to the reflective electrodes 5. Reference numeral 34 denote source regions of the active elements 30, 35 are drain regions of the active elements 30, 36 are gate electrodes of the active elements 30, 38 are insulating films, 31 and 40 are first and second electrodes for forming pixel capacitances with the insulating film 38 therebetween, respectively. In FIG. 7, the first and second electrodes 31, 40 are illustrated as representative electrodes for forming the pixel capacitances, and if other conductive layers electrically connected to the pixel electrodes and other conductive layers connected to the pixel-potential control line faces each other with a dielectric layer therebetween, they can form the pixel capacitance.

In FIG. 7, reference numeral 41 are first interlayer insulating films, and 42 are first conductive films which connect the drain regions 35 and the second electrodes 40 electrically, 43 are second interlayer insulating films, 44 are first light blocking films, 45 are third interlayer insulating films, 46 are second light blocking films. Through-holes 42CH are made in the second and third interlayer insulating films 43, 45, and thereby the first conductive film 42 and the second light-blocking film 46 are electrically connected together. Reference numeral 47 are fourth interlayer insulating films, and 48 are second conductive films forming reflective electrodes 5. The gray scale voltage is transmitted to the reflective electrode 5 via the first conductive film 42, the through-hole 42CH and the second light-blocking film 46 from the drain region 35 of the active element 30.

The liquid crystal display device in this embodiment is of the reflective type. A large amount of light (from a lamp, for example) is projected into the liquid crystal display panel 100. The light-blocking films block light from entering a semiconductor layer of the drive circuit substrate. In the reflective type liquid crystal display device, light projected into the liquid crystal display panel 100 enters from the transparent substrate 2 (at the top of FIG. 7), then passes through the liquid crystal composition 3, then is reflected back by the reflective electrode 5, then passes through the liquid crystal composition 3 and the transparent substrate 2 again, and then leaves the liquid crystal display panel 100. However, a portion of the light projected into the liquid crystal display panel 100 leaks toward the drive circuit substrate 1 through gaps between adjacent ones of the reflective electrodes 5. The first and second light-blocking films 44 and 46 are provided to prevent light from entering the active elements 30. In this embodiment, the first and second light-blocking films 44 and 46 are made of conductive films, the second light-blocking film 46 is electrically connected to the reflective electrode 5, and the first light-blocking film 44 is supplied with the pixel-potential control signal so that the light-blocking films form a portion of the pixel capacitance.

Incidentally, if the first light-blocking film 44 is supplied with the pixel-potential control signal, the first light-blocking film 44 can serve as an electric shield layer between the second light-blocking films 46 supplied with the gray scale voltage, and the first conductive layer 42 forming the video signal lines 103 and conductive layers (coplanar with the gate electrodes 36) forming the scanning signal lines 102. This reduces parasitic capacitances between the first conductive layers 42 and the gate electrodes 36, and the second light-blocking films 46 and the reflective electrodes 5. As described above, it is necessary to make the pixel capacitance CC sufficiently larger than the liquid crystal capacitance CL. If the first light-blocking film 44 is provided as an electric shield, since parasitic capacitance connected in parallel with the liquid crystal capacitance LC is reduced, it is effective for obtaining the above relationship. Further, it is possible to reduce the amount of noise introduced from the signal lines.

In the liquid crystal display element of the reflective type, when the reflective electrode 5 is disposed on the surface of the drive circuit substrate 1 on its liquid crystal composition 3 side, an opaque substrate such as a silicon substrate can be used as the drive circuit substrate 1. This structure has advantages that the active elements 30 and wiring can be disposed below the reflective electrodes 5, thereby the area of the reflective electrodes 5 can be increased which form pixels, and consequently, the higher aperture ratio can be realized. Also this structure has an advantage of radiating heat generated by light projected into the liquid crystal display panel 100 from the back surface of the drive circuit substrate 1.

Figure 8:
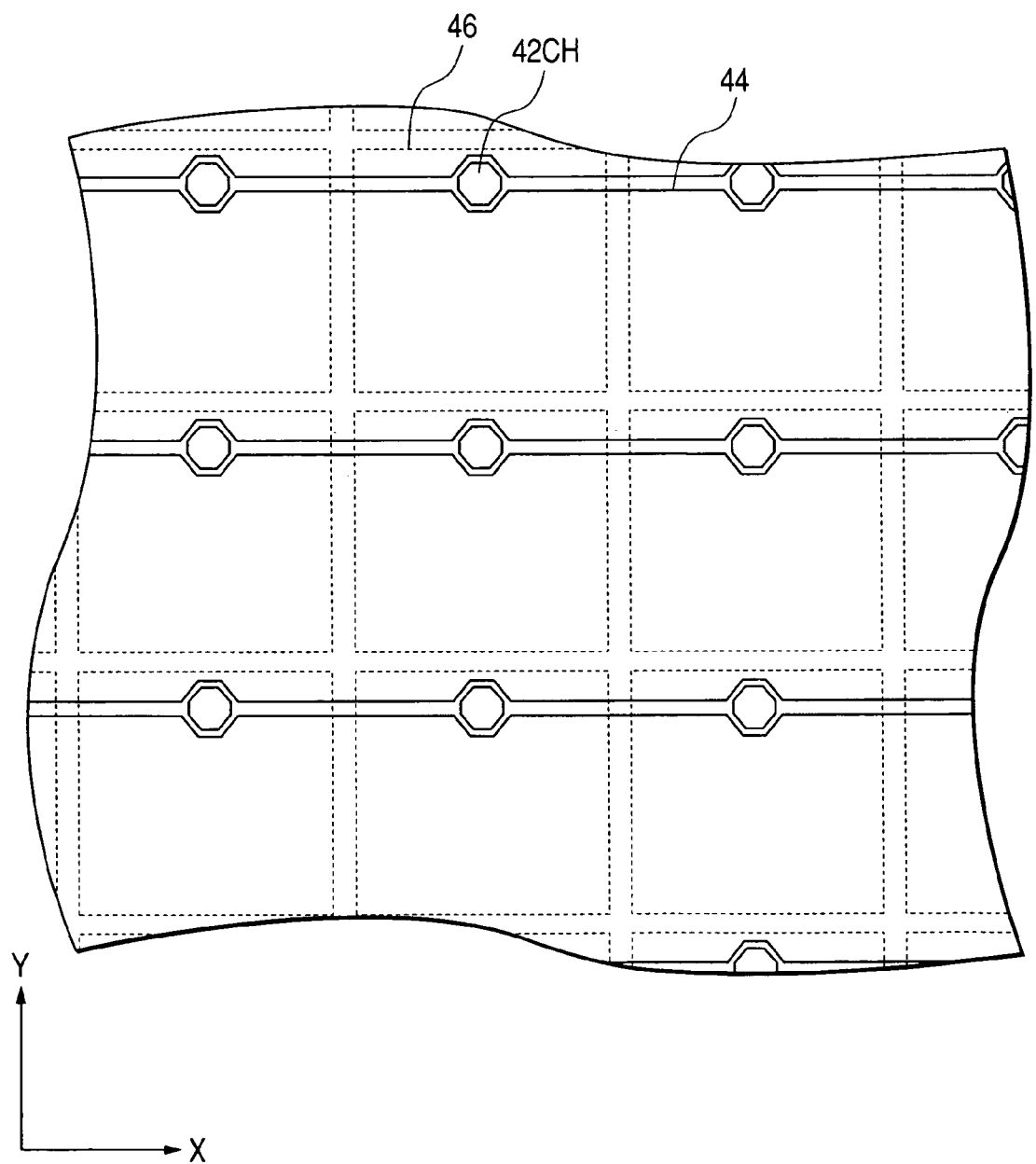
FIG. 8 is a schematic plan view of a configuration of pixel-potential control lines formed by using light-blocking films.

The following explains formation of a portion of the pixel capacitance by using the light-blocking films. The first light-blocking film 44 and the second light-blocking film 46 faces each other with the third interlayer insulating film 45 interposed therebetween, and forms a portion of the pixel capacitance. Reference numeral 49 denotes a conductive layer forming a portion of the pixel-potential control line 136. The first electrode 31 and the first light-blocking film 44 are electrically connected by the conductive layer 49. The conductive layer 49 can be used to form wiring between the pixel-potential control circuit 135 and the pixel capacitance. However, in this embodiment, the first light-blocking film 44 was used for the wiring. FIG. 8 illustrates a configuration in which the first light-blocking film 44 is used as the pixel-potential control line 136.

FIG. 8 is a plan view illustrating the arrangement of the first light-blocking films 44. Reference numeral 46 denote the second light-blocking films represented by broken lines for the purpose of indicating their arrangement, although they overlie the first light-blocking films 44. Reference numeral 42CH denote through-holes which connect the first conductive film 42 and the second light-blocking film 46. In FIG. 8, other elements are omitted to avoid complicating the figure. The first light-blocking films 44 serve as the pixel-potential control lines 136, and therefore they are fabricated to extend continuously in the X direction in FIG. 8. The first light-blocking films 44 are fabricated to cover the entire display area so as to serve as the light-blocking films, and they extend in lines in the X direction (the direction parallel with that of the scanning signal lines 102, are arranged in the Y direction, and are connected to the pixel-potential control circuit 135 so that they serve as the pixel-potential control lines 136 also. The first light-blocking films 44 are disposed to overlap the second light-blocking films 46 in areas as large as possible so that they also serve as the electrodes of the pixel capacitances, and gaps between adjacent ones of the first light-blocking films 44 are made as small as possible to reduce leakage of light.

When the gaps between the adjacent lines of the first light-blocking films 44 are made small as shown in FIG. 8, a portion of one line of the first light-blocking films 44 underlies one row of the second light-blocking films 46 associated with a succeeding line of the first light-blocking films 44. As described above, the liquid crystal display device in accordance with the present invention is capable of scanning in two directions. When the pixel-potential control signal is utilized in the bidirectional scanning, there occurs two cases: one case where one line of the first light-blocking films 44 overlaps a row of the second light-blocking films 46 associated with the next line of the first light-blocking films 44, and the other case where the above-mentioned overlapping does not occur.

In a case illustrated in FIG. 8, when the scanning is performed in a direction from the top to the bottom of the figure, a portion of one line of the first light-blocking films 44 underlies one row of the second light-blocking films 46 associated with the next-to-be-scanned line immediately succeeding the one line of the first light-blocking films 44.

Figure 9A:
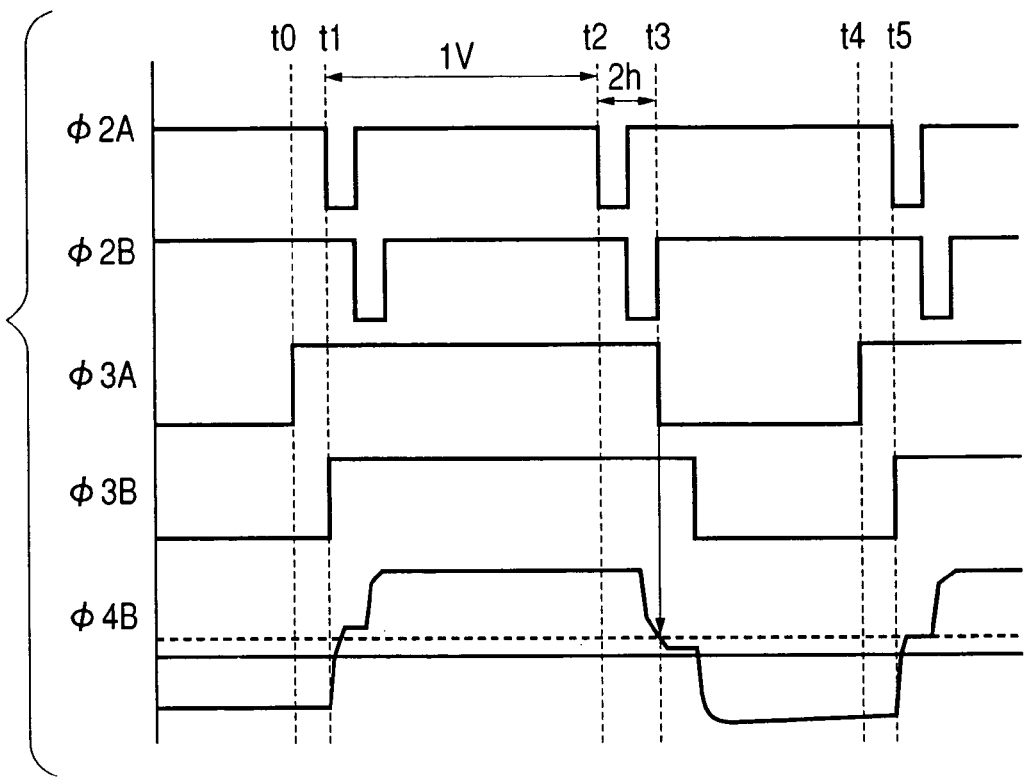
FIGS. 9A and 9B are timing charts illustrating a method of driving a liquid crystal display device in accordance with an embodiment of the present invention.
Figure 9B:
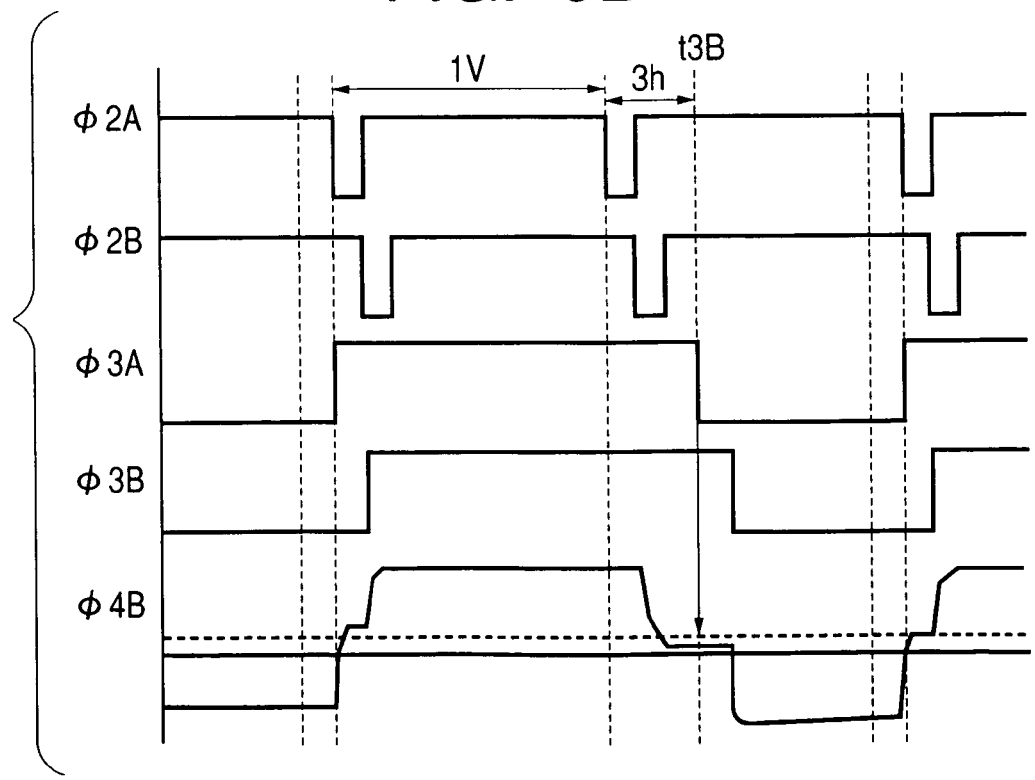

The following explains a problem and its solution with the overlap between a portion of one line of the first light-blocking films 44 and one row of the second light-blocking films 46 associated with the next scanned line of the first light-blocking films 44 by reference to FIGS. 9A and 9B.

FIG. 9A illustrates timing charts for explaining the problem. In FIG. 9A, .2A is a scanning signal for a given line A, and will be designated as the scanning signal for the line A, and .2B is a scanning signal for the next succeeding line B, and will be designated as the scanning signal for the line B. The following explains a period from time t2 to time t3 during which the problem arises, and the explanation of the remaining time will be omitted.

In FIG. 9A in scanning the line A at time t3, after a time of 2 h (two horizontal scanning periods) from the time t2, a pixel-potential control signal .3A is changed. After a time of 1 h from the time t2, the output of the scanning signal .2A has ceased, the active elements 30 driven by the scanning signal .2A for the line A are turned OFF, and as a result the pixel electrodes 109 in the line A are cut off from the video signal lines 103. At the time t3, after a time of 2 h from the time t2, the active elements 30 in the line A are in the sufficiently OFF even when time delays as caused by switching of signals are considered. However, the time t3 is a time at which the scanning signal .2B for the line B is changed.

Since the first light-blocking films 44 in the line A overlap the second light-blocking films 46 connected to the pixel electrodes 109 in the line B, capacitances are formed between the pixel electrodes in the line B and the pixel-potential control line in the line A. Since the time t3 is a time at which the active elements 30 in the line B change to the OFF state, the pixel electrodes 109 in the line B are not sufficiently cut off from the video signal lines 103 at this time. At this time t3, if the pixel-potential control signal .3A for the line A, which is capacitively coupled to the pixel electrodes 109 in the line B, is changed, electrical discharges are transferred between the video signal lines 103 and the pixel electrodes 109 because they are not sufficiently cut off from each other. Consequently, the change of the pixel-potential control signal .3A for the line A exerts an influence upon a voltage .4B written into the pixel electrodes 109 in the line B. .3B in FIGS. 9A and 9B represents a pixel-potential control signal for the line B.

The influence by the change of the pixel-potential control signal .3A is not very conspicuous if a single liquid crystal display device is operated with its scanning direction being fixed, because the influence is uniform over the entire display area. However, when a color display is produced by superposing three red, green and blue images from three separate liquid crystal display devices provided for the three red, green and blue primary colors, respectively, there is a case in which only one of the three liquid crystal display devices scans its display area from bottom to top, and the other two of the three liquid crystal display devices scan their display areas from top to bottom, for example, because of their optical arrangement. Like in this case, if the scanning directions differ among the plural liquid crystal display devices, quality of the display becomes non-uniform among the liquid crystal display device, and the combined display is degraded.

A method of solving the above problem will be explained by reference to FIG. 9B. In this method, the pixel-potential control signal .3A for the line A is output after a time delay of 3 h from the beginning of the scanning signal .2A for the line A. At this time, the scanning signal .2B for the line B has ceased, therefore the active elements 30 in the line B are in the sufficiently OFF state, and consequently, this relationship reduces the influence exerted on the voltage .4B written into the pixel electrodes 109 in the line B by the pixel-potential control signal .3A for the line A. In this case, the length of the time for the negative-polarity-voltage-input signal to be written is made shorter by time as long as 3 h than that for the positive-polarity-voltage-input signal, but the reduction in time is equal to or less than 3% when the number of the scanning signal lines 102 exceeds 100, for example. Difference in root-mean-square value between the negative-polarity-voltage-input and positive-polarity-voltage-input signals can be adjusted by the reference voltage Vcom or the like.

Figure 10A:
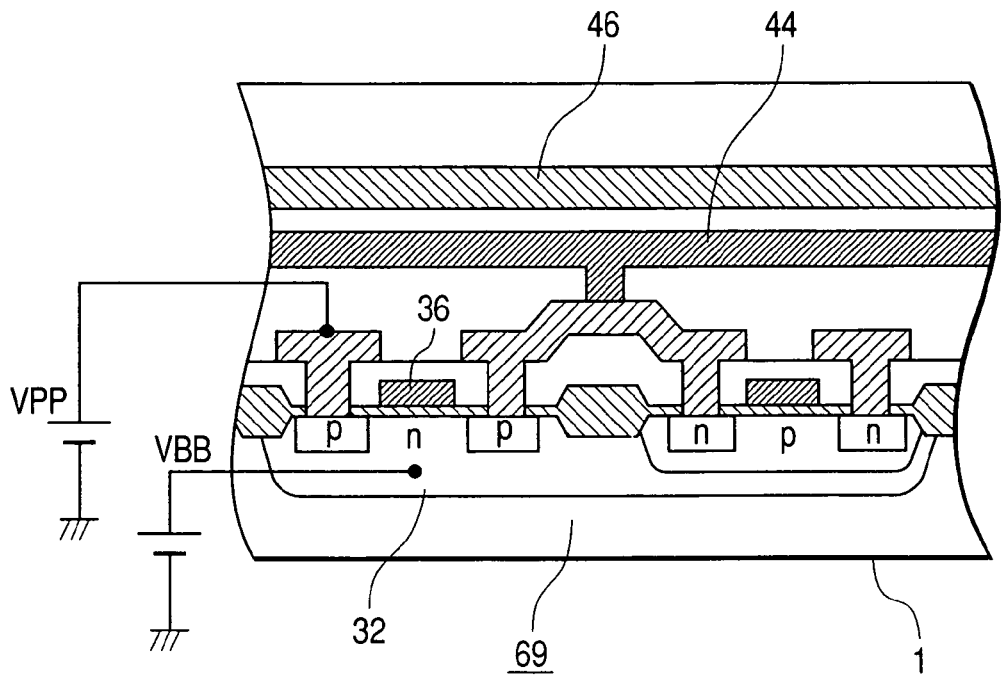
FIG. 10A is a cross-sectional view of an inverter circuit constituting an output circuit in the liquid crystal display device in accordance with an embodiment of the present invention.

The relationship between the voltage VPP supplied to the pixel capacitance and the substrate potential VBB will be explained by reference to FIGS. 10A and 10B. FIG. 10A is a cross-sectional view of an inverter circuit constituting the output circuit 69.

In FIG. 10A, reference numeral 32 denotes a channel region of a p-channel type transistor which is an n-type well fabricated as by implanting ions into the silicon substrate 1. The silicon substrate 1 is supplied with the substrate voltage VBB, and the potential of the n-type well 32 is VBB. The source region 34 and the drain region 35 are formed of p-type semiconductor layers fabricated as by implanting ions into the substrate 1. When the gate electrode 36 of the p-channel type transistor 30 is supplied with a voltage lower than the substrate voltage VBB, there is formed a conducting layer between the source region 34 and the drain region 35. Generally, since there is no need for providing insulating sections, and therefore the structure is simplified, the transistors fabricated on the same silicon substrate are supplied with the common substrate potential VBB. In the liquid crystal display device in accordance with the present invention, the transistors in the drive circuit section and those in the pixel section are fabricated on the same silicon substrate 1. The transistors in the pixel section are also supplied with the above-mentioned substrate potential VBB for the above-explained reason.

In the inverter circuit shown in FIG. 10A, the source regions 34 are supplied with the voltage VPP supplied to the pixel capacitance. The source regions 34 are formed of p-type semiconductor layers, and forms a p-n junction with the n-type well 32. When the potential of the source region 34 is made higher than that of the n-type well 32, a problem arises in that a current flows from the source region 34 into the n-type well 32. In view of this problem, the voltage VPP is selected to be lower than the substrate voltage VBB.

As explained above, the voltage of the pixel electrode after being dropped by the pixel-potential control signal is represented by $V2-\{CC/(CL+CC)\}\times(VPP-VSS)$, where V2 is a voltage written into the pixel electrode, CL is a liquid crystal capacitance, CC is a pixel capacitance, and (VPP−VSS) is an amplitude of the pixel-potential control signal. If the voltage VSS is selected to be ground potential GND, the amount of variation in the pixel electrode voltage is determined by the voltage VPP, the liquid crystal capacitance CL and the pixel capacitance CC.

Figure 10B:
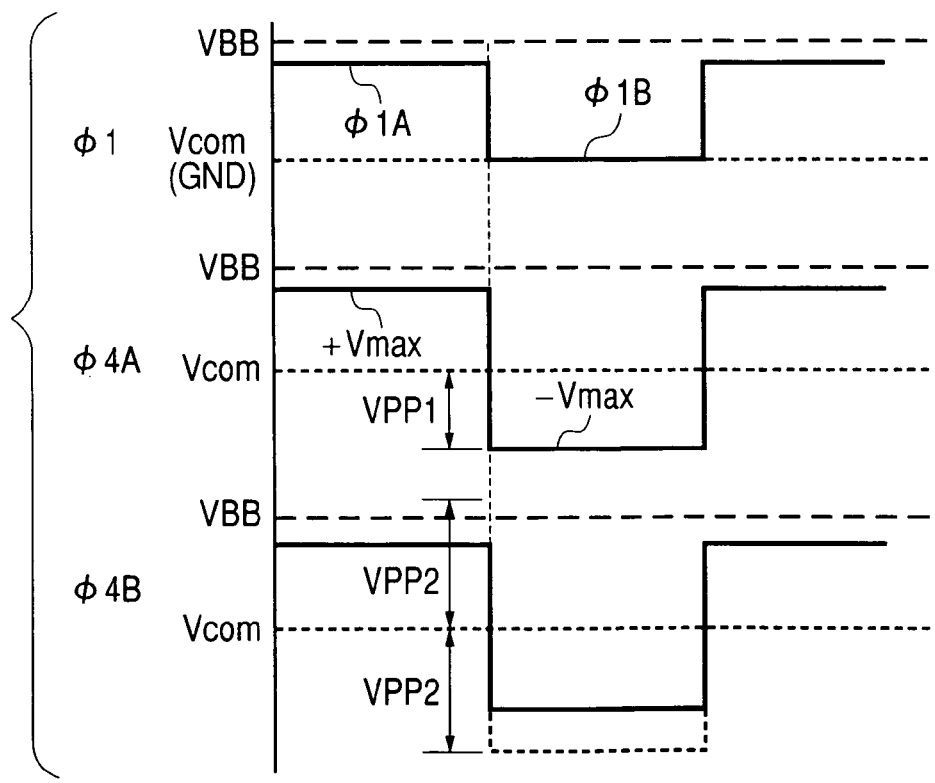
FIG. 10B illustrates timing charts for explaining operation of the liquid crystal display device in accordance with an embodiment of the present invention.

FIG. 10B illustrates a relationship between CC/(CL+CC) and the voltage VPP. For simplicity, the reference voltage Vcom is taken to be the ground potential GND. The following explains a case where, in the liquid crystal display device of the normally white type producing a white image in the voltage-OFF state, a gray scale voltage is applied to the pixel electrode so as to produce a black image (the lowest level of the gray scale). .1 in FIG. 10B represents a gray scale voltage written into the pixel electrode from the voltage selector circuit 123. .1A is a positive-polarity-voltage-input signal of the gray scale voltage .1, and .1B is a negative-polarity-voltage-input signal of the gray scale voltage .1. For formation of the black image, .1A and .1B are selected to maximize a difference between the reference voltage Vcom and the gray scale voltage written into the pixel electrode.

In FIG. 10B, since .1A is a positive-polarity-voltage-input signal for applying a positive-polarity voltage, as usual .1A is taken to be +Vmax so as to maximize its voltage difference with respect to the reference voltage Vcom. .1B is taken to be Vcom (GND), and initially .1B is written into the pixel electrode and thereafter the potential of the pixel electrode is dropped by using the pixel capacitance.

.4A and .4B of FIG. 10B indicate voltages of the pixel electrode for an ideal case where CC/(CL+CC)=1, and an unideal case where CC/(CL+CC)<1, respectively.

First the ideal case will be considered. In the period during which the voltage .4A on the pixel electrode is negative, since initially the voltage Vcom (GND) is written into the pixel electrode as .1B, the maximum negative voltage (−Vmax) obtained by lowering the pixel electrode potential by the amplitude VPP of the pixel-potential control signal .3 becomes (−Vmax)=−VPP because of the relationship of CC/(CL+CC)=1.

Next the unideal case will be considered. For the period during which the voltage .4B on the pixel electrode is negative, the amplitude VPP2 of the pixel-potential control signal .3 needs to be selected to satisfy the relationship +Vmax<VPP2 because CC/(CL+CC). As described above, the relationship VPP<the substrate potential VBB, and consequently, the relationship +Vmax<VPP<VBB needs to be satisfied.

In this embodiment, a method of lowering the pixel electrode voltage having been written is employed to realize a low voltage circuit, but if the magnitude VPP of the pixel-potential control signal .3 is excessively high, therefore the substrate voltage VBB becomes too high, and after all the circuit will be a high-voltage circuit. In view of this, it is necessary to select the values of CL and CC so that CC/(CL+CC) becomes as dose to 1 as possible, in other words, CL<<CC is satisfied.

In the conventional liquid crystal display device of the type fabricating thin film transistors on a glass substrate, since it is necessary to make the area of the pixel electrode as large as possible, i.e., to increase the aperture ratio, the realizable ratio of CC/CL is approximately 1.0 at most. In the liquid crystal display device of this embodiment, the drive circuit section and the pixel section are fabricated on the same silicon substrate, utilization of a high voltage as the substrate potential VBB makes it difficult to realize a low-voltage circuit.

Figure 11:
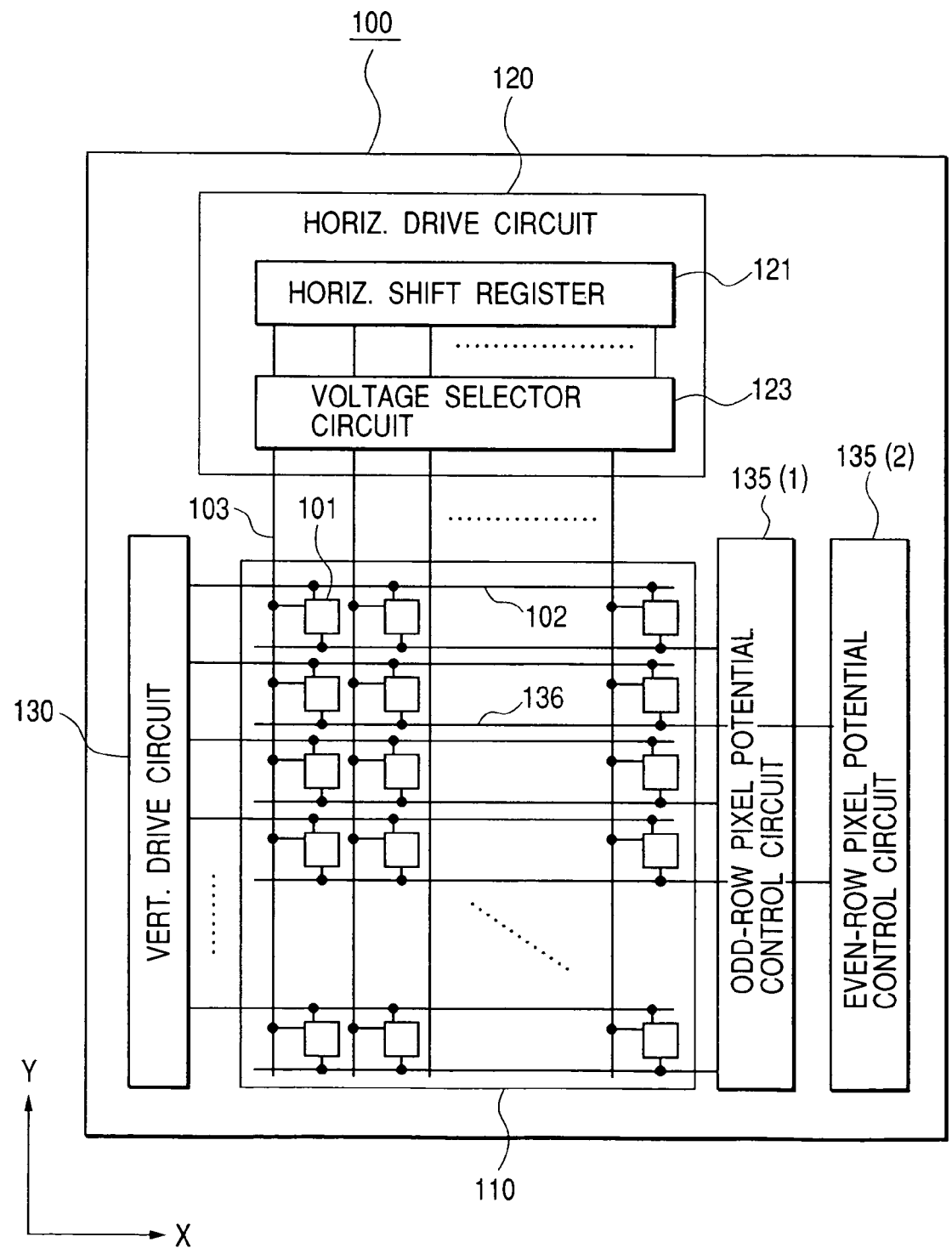
FIG. 11 is a schematic plan view of a liquid crystal display device in accordance with an embodiment of the present invention.
Figure 12:
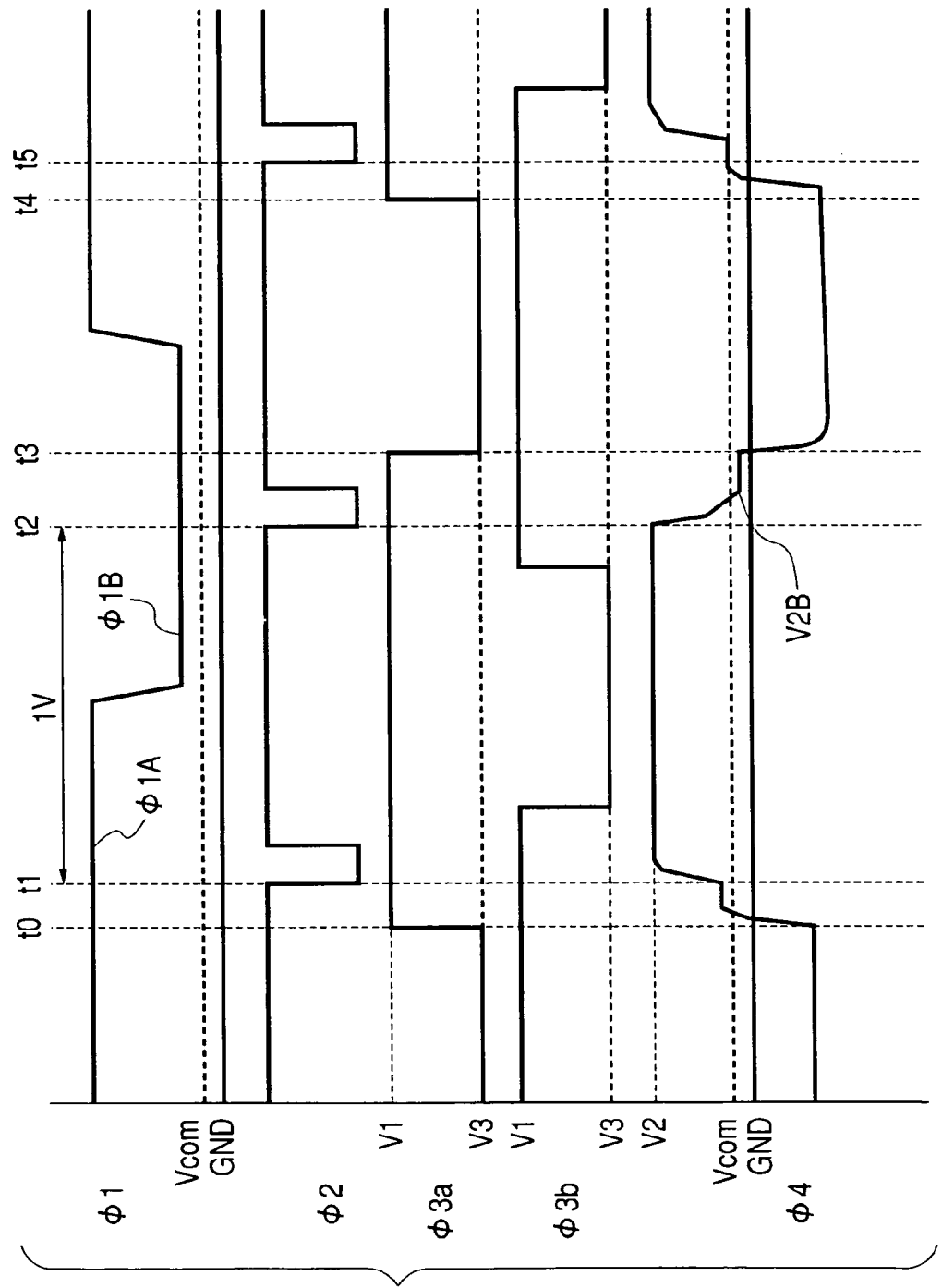
FIG. 12 is a timing chart for illustrating a method of driving a liquid crystal display device in accordance with an embodiment of the present invention.

Next an embodiment of a row-inversion driving method will be explained by reference to FIGS. 11 and 12. The liquid crystal display device 100 shown in FIG. 11 are provided with an odd-row pixel-potential control circuit 135(1) and an even-raw the pixel-potential control circuit 135(2). In the row-inversion driving method, when positive-polarity gray scale voltages are written into the pixel electrodes in the odd rows, for example, negative-polarity gray scale voltage are written into the even rows for the purpose of ac driving. In the row-inversion driving method, voltage polarity is reversed every other row, and therefore the waveform of the pixel-potential control signal needs to change every other row. Therefore, as shown in FIG. 11, the pixel-potential control circuit 135(1), 135(2) for the odd and even rows, respectively, are provided for outputting two kinds of waveforms .3a and .3b of the pixel-potential control signals alternately as shown in FIG. 12 so as to perform the row-inversion driving.

Next, the reflective type liquid crystal display device will be explained. As one of the reflective type liquid crystal display element, the electrically controlled birefringence mode is known. In the electrically controlled birefringence mode, orientation of molecules of the liquid crystal composition is changed by applying a voltage between the reflective electrode and the counter electrode sandwiching the liquid crystal composition to thereby change the birefringence of the liquid crystal layer. The electrically controlled birefringence mode generates images by converting the changes of the birefringence into the changes of light transmission.

Next, the single-polarizer twisted nematic (SPTN) mode, which is one type of the electrically controlled birefringence mode, will be explained by reference to FIGS. 13A and 13B.

Reference numeral 9 denotes a polarizing beam splitter which divides an incident light L1 from a light source (not shown) into two polarized lights, and a linearly polarized light L2 of the two is emitted.

In FIGS. 13A and 13B, a light having passed through the polarizing beam splitter 9, which is a p-polarized light, is entered into the liquid crystal display panel 100, but instead a light reflected by the polarizing beam splitter 9, which is an s-polarized light, can be entered into the liquid crystal display panel 100.

The liquid crystal composition 3 is a nematic liquid crystal material having positive dielectric anisotropy. Longitudinal axes of the liquid crystal molecules are oriented approximately in parallel with the major surfaces of the drive circuit substrate 1 and the transparent substrate 2, and the liquid crystal molecules are twisted through about 90 degrees across the liquid crystal layer by the orientation films 7, 8.

FIG. 13A illustrates a case where no voltage is applied across the layer of the liquid crystal composition 3. The light L2 entering the liquid crystal display panel 100 is converted into elliptically polarized light by birefringence of the liquid crystal composition 3, and then becomes circularly polarized light on the reflective electrode 5. The light reflected by the reflective electrode 5 passes through the liquid crystal composition 3 again, thereby becomes elliptically polarized light again, and then returns to linearly polarized light again when it leaves the liquid crystal display panel 100. The emergent linearly polarized light L3 is s-polarized light having its direction of polarization rotated through an angle of 90° with respect to that of the incident light L2, enters the polarizing beam splitter 9 again, and then is reflected by an internal interface of the polarizing beam splitter 9 to become emergent light L4 which in turn is projected onto a screen or the like to produce a display. This configuration is of the so-called normally white (normally open) type which emits light when a voltage is not applied across the layer of the liquid crystal composition 3.

FIG. 13B illustrates a case where a voltage is applied across the layer of the liquid crystal composition 3. When an electric field is applied across the layer of the liquid crystal composition 3, the liquid crystal molecules align in a direction of the electric field and consequently, the birefringence of the liquid crystal molecules does not appear. As a result, the linearly polarized light L2 entering the liquid crystal display panel 100 is reflected by the reflective electrode 5 without undergoing changes, and then the light L5 emergent from the liquid crystal display panel 100 has the same direction of polarization as that of the incident light L2. The emergent light L5 passes through the polarizing beam splitter 9, and returns to the light source such that no light is projected onto the screen and a black display is provided on the screen.

In the single-polarizer twisted nematic mode, the direction of orientation of the liquid crystal molecules is parallel with the major surfaces of the substrates, and therefore usual methods of orientating the liquid crystal molecules can be employed and its manufacturing process is highly stable. The normally white mode operation is preventive of defective displays occurring at low voltage levels. The reason is that, in the normally white mode, a dark level (a black display) is provided when a high voltage is applied across the liquid crystal layer, and in this state, almost all the liquid crystal molecules are orientated in the direction of the electric field which is perpendicular to the major surfaces of the substrates, and consequently, a display of the dark level does not depend very much upon the initial conditions of orientation of the liquid crystal molecules having a low electric field applied thereto. The human eye perceives non-uniformity in luminance based upon the ratio of luminances, is responsive approximately to the logarithm of luminance, and consequently, is sensitive to variations in dark levels. Because of the above reasons, the normally white mode has advantages with respect to prevention of non-uniformity in luminance caused by initial conditions of orientation of the liquid crystal molecules.

The electrically controlled birefringence mode requires a highly precise cell gap between the substrates of the liquid crystal display panel. The electrically controlled birefringence mode utilizes a phase difference between ordinary rays and extraordinary rays caused while they pass through the liquid crystal layer, and therefore the intensity of the light transmission through the liquid crystal layer depends upon the retardation .n.d between the ordinary and extraordinary rays, where .n is a birefringence and d is a cell gap established by spacers 4 between the transparent substrate 2 and the drive circuit substrate 1.

In this embodiment, in view of non-uniformity in display, the cell gap was controlled with accuracy of ±0.05 .m. In the reflective type liquid crystal display panel, light entering the liquid crystal layer is reflected by the reflective electrode, and then passes through the liquid crystal layer again, therefore, if the reflective type liquid crystal display panel uses a liquid crystal composition having the same birefringence .n as that of a liquid crystal composition used in the transmissive type liquid crystal display panel, the cell gap d of the reflective type liquid crystal display panel is half that of the transmissive type liquid crystal display panel. Generally, the cell gap d of the transmissive type liquid crystal display panel is in a range of from about 5 microns to about 6 microns, but in this embodiment the cell gap d is selected to be about 2 microns.

In this embodiment, to ensure a high accuracy of the cell gap and a smaller cell gap than that of conventional liquid crystal display panels, column-like spacers are fabricated on the drive circuit substrate 1 instead of using a conventional bead-dispersing method.

Figure 14:
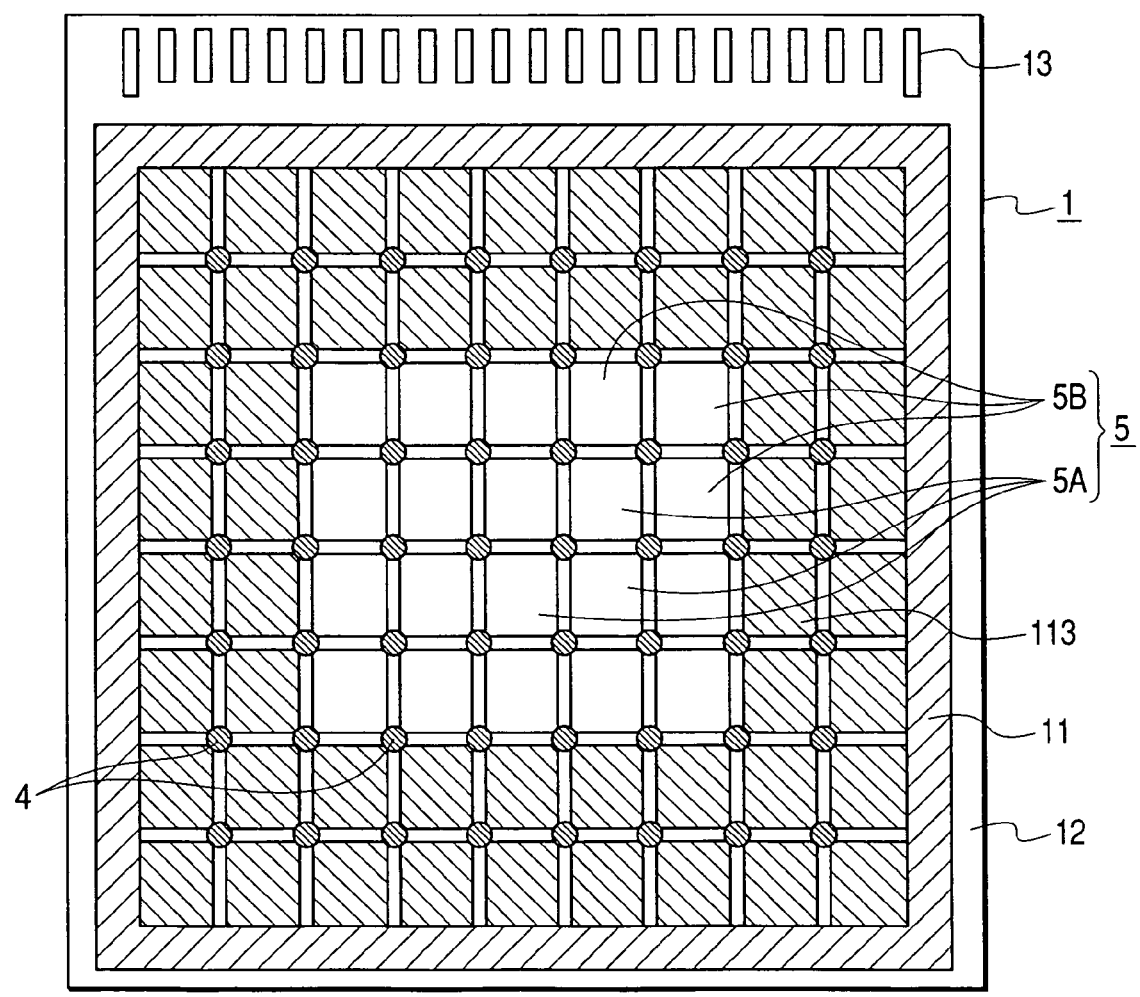
FIG. 14 is a schematic plan view of a liquid crystal display panel in accordance with an embodiment of the present invention.

FIG. 14 is a schematic plan view of a liquid crystal display panel for explaining an arrangement of the reflective electrodes 5 and the spacers 4 disposed on the drive circuit substrate 1. A large number of spacers 4 are arranged in a matrix array over the entire area of the drive circuit substrate 1 for establishing a uniform spacing between the transparent substrate 2 and the drive circuit substrate 1. Each of the reflective electrodes 5 defines a pixel serving as the smallest picture element formed by the liquid crystal display panel. For the sake of simplicity, FIG. 14 illustrates an array of five columns by four rows of pixels, pixels in the outermost columns and rows are represented by reference numeral 5B, pixels within the outermost columns and rows are represented by reference numeral 5A.

In FIG. 14, the array of five columns by four rows of pixels forms a display area, in which a display by the liquid crystal display panel is formed. Dummy pixels 113 are disposed around the display area, a peripheral frame 11 made of the same material as that of the spacers 4 is disposed around the dummy pixels 113, and a sealing member 12 is coated around the peripheral frame 11 on the drive circuit substrate 1. Reference numeral 13 denotes terminals for external connections which are used for supplying external signals to the liquid crystal display panel 100.

The spacers 4 and the peripheral frame 11 are formed of resin material. As the resin material can be used a chemically amplified type negative photoresist "BPR-113" (a trade name) manufactured by JSR Corp. (Tokyo, Japan), for example. The photoresist material is coated as by a spin coating method on the drive circuit substrate 1 having the reflective electrodes 5 formed thereon, then is exposed through a mask having a pattern in the form of the spacers 4 and the peripheral frame 11, and then is developed by a remover to form the spacers 4 and the peripheral frame 11.

When the spacers 4 and the peripheral frame 11 is fabricated by using photoresist or the like as their material, the height of the spacers 4 and the peripheral frame 11 can be controlled by coating thickness of the material, and therefore the spacers 4 and the peripheral frame 11 can be fabricated with high precision. The positions of the spacers 4 can be determined by the mask pattern, and consequently, the spacers 4 can be located at the desired positions accurately.

In the liquid crystal display panel employed in a liquid crystal projector, if one of the spacers 4 is present on a pixel, a problem arises in that a shadow of the spacer 4 is visible in its projected enlarged image. By fabricating the spacers 4 by exposure through a mask pattern and subsequent development, the spacers 4 can be located at such positions as not to deteriorate the quality of a displayed image.

Since the spacers 4 and the peripheral frame 11 have been fabricated simultaneously, the liquid crystal composition 3 can be sealed between the drive circuit substrate 1 and the transparent substrate 2, by initially dropping a small amount of the liquid crystal composition 3 on the drive circuit substrate 1, then overlapping the transparent substrate 2 on the drive circuit substrate 1 with the liquid crystal layer therebetween, and then bonding the transparent substrate 2 to the drive circuit substrate 1.

When the liquid crystal display panel 100 has been assembled after interposing the liquid crystal composition 3 between the drive circuit substrate 1 and the transparent substrate 2, the liquid crystal composition 3 is held within a region surrounded by the peripheral frame 11.

The sealing member 12 is coated around the outside of the peripheral frame 11 and confines the liquid crystal composition 3 within the liquid crystal display panel 100.

As described above, the peripheral frame 11 is fabricated by using the pattern mask, and therefore it is fabricated on the driving circuit substrate 1 with high positional accuracy, and consequently, the border of the liquid crystal composition 3 can be defined with high accuracy. Further, the peripheral frame 11 can define the border of the sealing member 12 with high accuracy.

The sealing member 12 serves to fix the drive circuit substrate 1 and the transparent substrate 2 together, and also serves to prevent materials harmful to the liquid crystal composition 3 from penetrating thereinto. When the fluid sealing member 12 is applied, the peripheral frame 11 serves as a stopper against the sealing member 12. By disposing the peripheral frame 11 as the stopper against the sealing member 12, the borders of the liquid crystal composition 3 and the sealing member 12 can be established with high precision, and consequently, the region between the display area and the peripheral sides of the liquid crystal display panel 100 can be reduced, resulting in the reduction of the peripheral border around the display area.

Dummy pixels 113 are disposed bet the peripheral frame 11 and the display area for making the quality of the display produced by the outermost pixels 5B equal to that of the display produced by the inner pixels 5A disposed inside the outermost pixels 5B. Since the inner pixels 5A have neighboring pixels, unwanted electric fields are generated between the inner pixels 5A and their neighboring pixels, and consequently, the quality of the display produced by the inner pixels 5A is made worse compared with that produced in the absence of their neighboring pixels.

On the other hand, assume a case where none of the dummy pixels 113 are provided, then unwanted electric fields degrading the display quality are not produced around the outermost pixels 5B, and as a result the display quality by the outermost pixels 5B is better compared with that by the inner pixels 5A. If some pixels have difference in display quality between them, non-uniformity occurs in display. To eliminate this problem, the dummy pixels 113 are provided and are supplied with signal voltages like the pixels 5A and 5B so that the display quality of the outermost pixels 5B is equalized with that of the inner pixels 5A.

Further, since the peripheral frame 11 is fabricated to surround the display area, a problem arises in that, in performing a rubbing treatment on the surface of the drive circuit substrate 1 for orientating the liquid crystal molecules of the liquid crystal composition 3 in a specified direction, the peripheral frame 11 impedes the rubbing treatment of the surface in the vicinity of the peripheral frame 11. In this embodiment, a liquid crystal molecule orientation film 7 (see FIG. 7) is coated on the drive circuit substrate 1 after the spacers 4 and the peripheral frame 11 are fabricated on the drive circuit substrate 1, and then the rubbing treatment is performed by rubbing the liquid crystal molecule orientation film 7 with a cloth or the like such that the rubbed orientation film 7 orients the liquid crystal molecules of the liquid crystal composition 3 in a specified direction.

In the rubbing treatment, because the peripheral frame 11 is raised above the surface of the drive circuit substrate 1, the orientation film 7 in the vicinity of the peripheral frame 11 is not rubbed sufficiently because of the step formed by the peripheral frame 11, and consequently, non-uniformity in orientation of the liquid crystal molecules is apt to occur in the vicinity of the peripheral frame 11. In order to make inconspicuous non-uniformity in a display caused by defective orientation of the liquid crystal molecules of the liquid crystal composition 3, some of the pixels immediately inside the peripheral frame 11 are fabricated as dummy pixels 113 which do not contribute to a display.

However, if the dummy pixels 10 are supplied with signals like the pixels 5A and 5B, a problem arises in that displays produced by the dummy pixels 10 are also observed by the viewer because of presence of the liquid crystal composition 3 between the dummy pixels 10 and the transparent substrate 2. In the liquid crystal display panel of the normally white type, the dummy pixels 113 appear white when a voltage is not applied across the layer of the liquid crystal composition 3, and consequently, the border of the display area becomes ill-defined and the quality of a display is deteriorated. It is conceivable to mask the dummy pixels 113, but it is difficult to fabricate a light-blocking frame at the border of the display area accurately because of a spacing of a few microns between the pixels, and therefore the dummy pixels 113 are supplied with such a voltage that the dummy pixels 113 display black images which appear as a black peripheral frame surrounding the display area.

Figure 15:
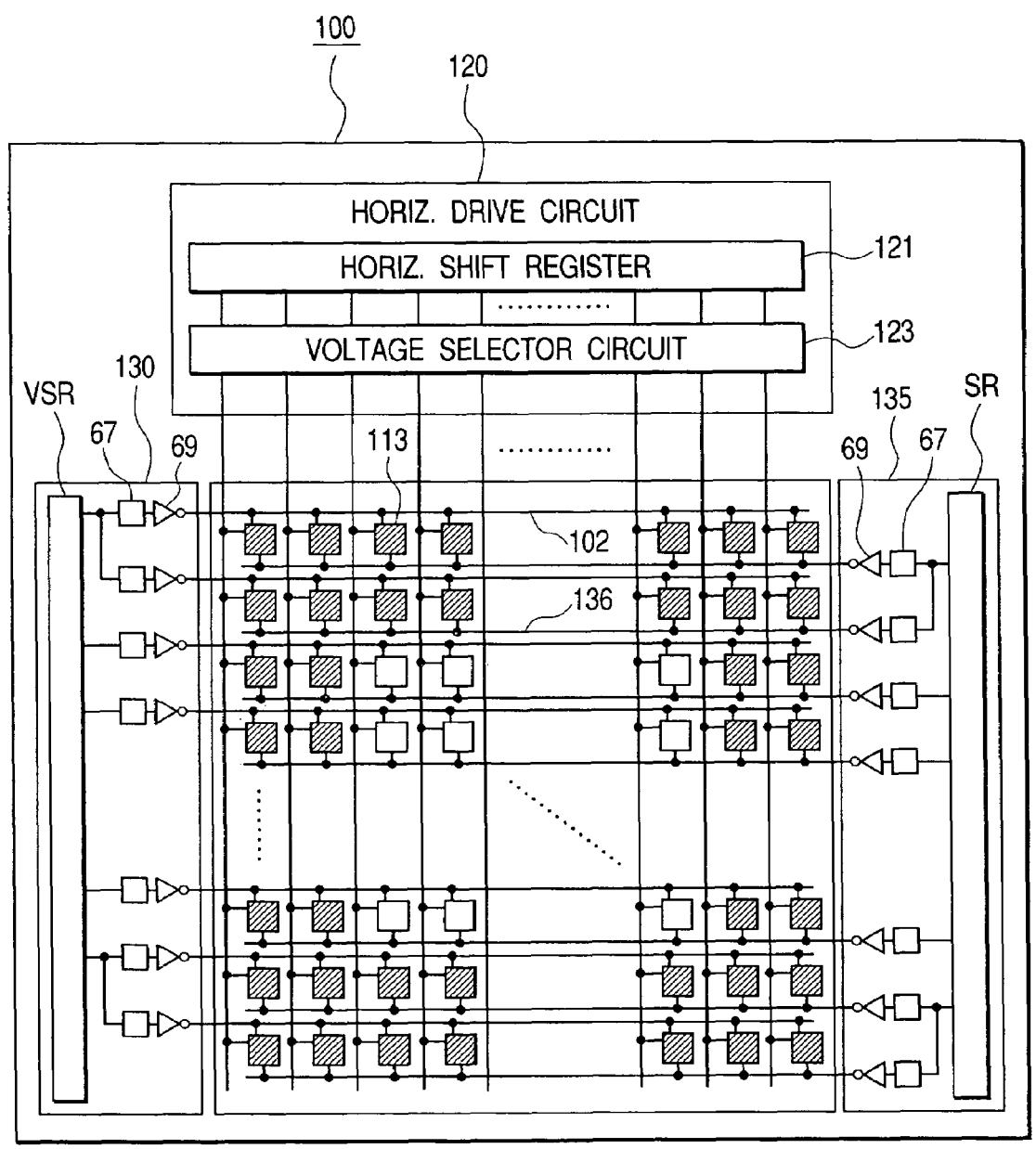
FIG. 15 is a schematic plan view of a liquid crystal display device in accordance with an embodiment of the present invention.

Next a method of driving the dummy pixels 113 will be explained by reference to FIG. 15. The dummy pixels 113 are supplied with a voltage to produce a black display, and therefore the entire area of the regions provided with the dummy pixels 113 appears black. If the dummy pixels 113 produces a continuous larger-area black display, it is not necessary to fabricate dummy pixels separate from each other as in the case of the pixels disposed in the display area, but the plural dummy pixels can be fabricated as electrically connected together. When time required for driving is considered, it is useless to provide writing time for the dummy pixels. It is possible to form a single dummy pixel by integrating plural dummy pixels, but the area of the single dummy pixel is increased, and as a result its liquid crystal capacitance becomes too large. As described above, if the liquid crystal capacitance becomes large, this increase degrades the efficiency of lowing the pixel electrode potential by using the pixel capacitance.

In view of the above, in this embodiment, the dummy pixels are also fabricated separately from each other like the pixels in the display area. However, if writing into the dummy pixels are performed row by row as in the case of writing into the useful pixels in the display area, this writing increases the length of time required for a plurality of rows of the dummy pixels newly added, and as a result the time available for writing of the useful pixels in the display area is reduced so much.

In a high-definition display, high-speed video signals (signals at high dot-clocks) are entered, time available for writing into pixels is further restricted. In view of this, to save time for writing into a few rows during a period used for writing one picture, as shown in FIG. 15, the bidirectional vertical shift register VSR of the vertical drive circuit 130 is configured so as to provide a timing signal to a plurality of rows of a series connection of a level shifter 67 and its output circuit 69 in common such that scanning signals are output to the plural dummy pixel rows at a time, and the bidirectional shift register SR of the pixel-potential control circuit 135 is also configured so as to provide a timing signal to a plurality of rows of a series connection of a level shifter 67 and its output circuit 69 in common such that the pixel-potential control signals are output to the plural dummy pixel ras at a time.

Figure 16:
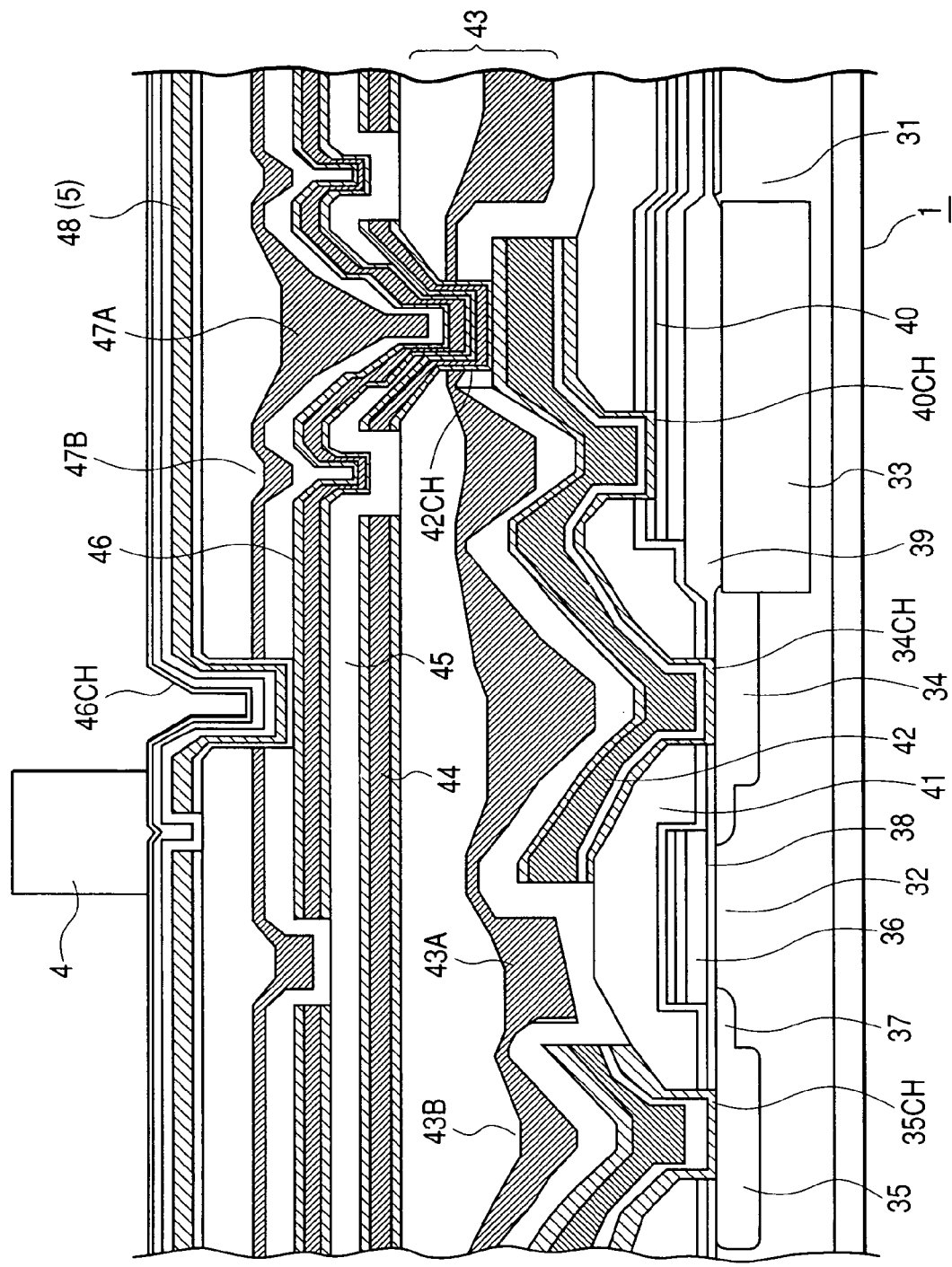
FIG. 16 is a schematic cross-sectional view of an active element and its vicinity for explaining a liquid crystal display device in accordance with an embodiment of the present invention.
Figure 17:
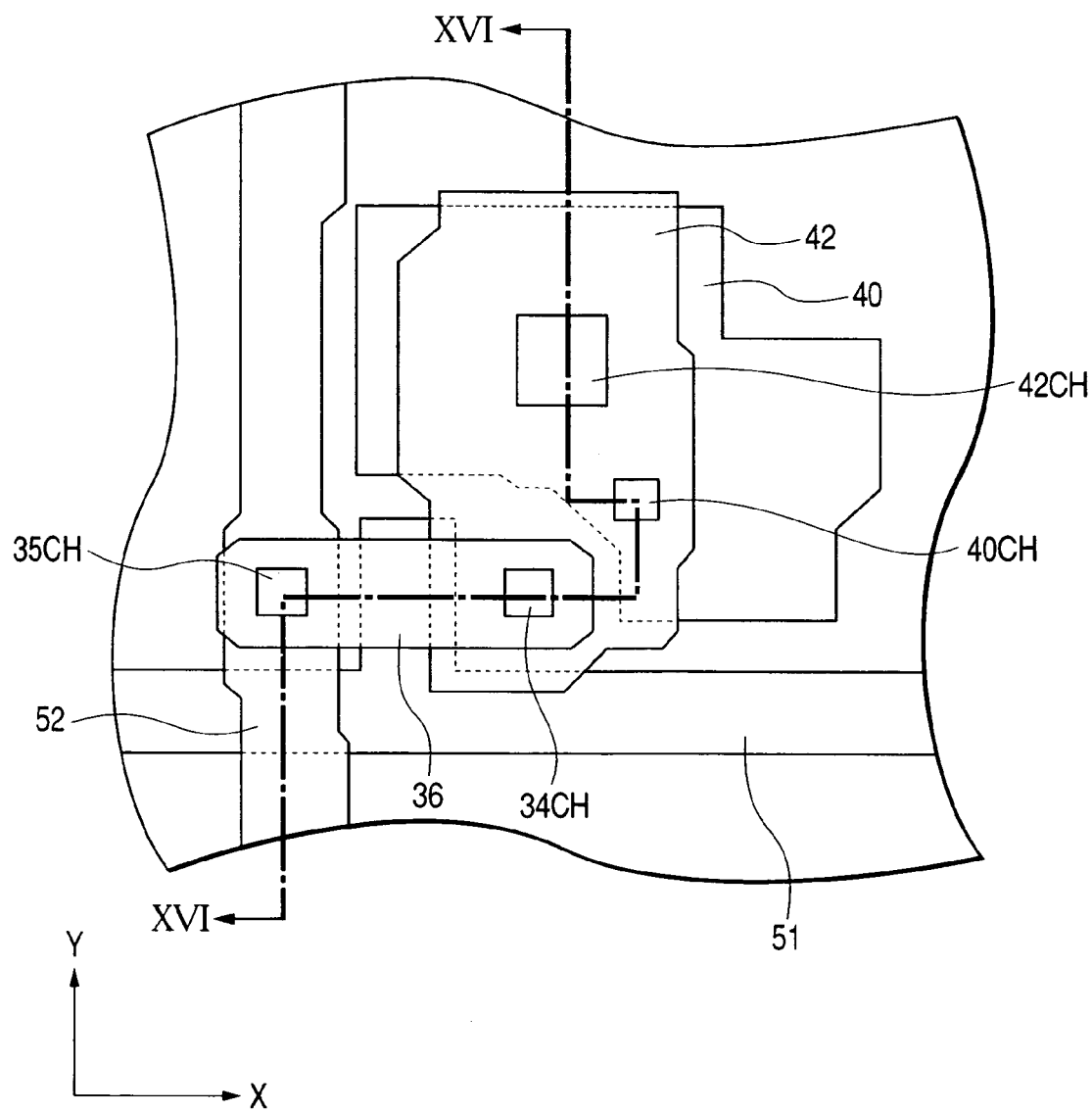
FIG. 17 is a schematic cross-sectional view of an active element and its vicinity for explaining a liquid crystal display device in accordance with an embodiment of the present invention.

The following explains a configuration of the active elements 30 and their vicinity fabricated on the drive circuit substrate 1 by reference to FIGS. 16 and 17. The same reference numerals as utilized in FIG. 7 designate corresponding portions in FIGS. 16 and 17. FIG. 17 is a schematic plan view of the active element 30 and its vicinity, and FIG. 16 is a cross-sectional view of FIG. 17 taken along line XVI-XVI. For clarity, distances between components in FIG. 16 are not made equal to corresponding ones in FIG. 17, and FIG. 17 is intended to illustrate positional relationships among the scanning signal lines 102, the gate electrode 36, the video signal line 103, the drain region 35, the source region 34, the second electrode 40 for forming the pixel capacitance, the first conductive layer 42, and the contact holes 35CH, 34CH, 40CH and 42CH, with the other components being omitted. In FIG. 16, reference numeral 1 denotes a silicon substrate serving as the drive circuit substrate, 32 is a semiconductor region (a p-type well) fabricated in the drive circuit substrate 1 by using ion implantation, 33 is a channel stopper, 34 is the drain region fabricated in the p-type well 32 by being made electrically conductive by ion implantation, 35 is the source region fabricated in the p-type well 32 by ion implantation, and 31 is the first electrode of the pixel capacitance fabricated in the p-type well 32 by being made electrically conductive by ion implantation. Incidentally, the p-channel type transistors are used as the active elements 30 in this embodiment, but n-channel type transistors can be used instead.

In FIG. 16, reference numeral 36 denotes the gate electrode, 37 is an offset region for relaxing electric fields at the edge of the gate electrode 36, 38 is an insulating film, 39 is the field oxide film for electrically insulating the transistors from each other, and 40 is the second electrode for forming the pixel capacitance in cooperation with the first electrode 31 fabricated in the silicon substrate 1 with the insulating film 38 therebetween. The gate electrode 36 and the second electrode 40 are made of a two-layer film formed of a conductive film for lowering a threshold voltage of the active element 30 and a low-resistance conductive film disposed on the insulating film 38. The two-layer film can be made of two poly silicon and tungsten silicide films, for example. Reference numeral 41 is the first insulating interlayer film, and 42 is the first conductive film. The first conductive film 42 is a multilayer film made of a barrier metal film for preventing imperfect contact and a low-resistance conductive film. For example, a sputtered multilayer metal film made of titanium tungsten (TiW) and aluminum can be used as the first conductive film.

In FIG. 17, reference numeral 102 denotes the scanning signal line. The scanning signal lines 102 extend in the X direction in FIG. 17, are arranged in the Y direction, and are supplied with scanning signals for turning the active elements 30 ON and OFF. The scanning signal lines 51 are formed of the same two-layer film as the gate electrodes 36. The two-layer film made of laminated poly-silicon and tungsten silicide films, for example, can be used as the scanning signal lines 102. The video signal lines 103 extend in the Y direction, are arranged in the X direction, and are supplied with video signals to be written into the reflective electrodes 5. The video signal lines 103 are formed of the same multilayer metal film as the first conductive films 42. The multilayer metal film made of titanium tungsten (TiW) and aluminum, for example, can be used as the video signal lines 103.

The video signals are supplied to the drain region 35 by the first conductive film 42 through the contact hole 35CH made in the insulating film 38 and the first insulating interlayer film 41. When a scanning signal is supplied to the scanning signal line 102, the active element 30 is turned ON, and the video signal is transmitted from the semiconductor region (the p-type well) 32 to the source region 34, and then is transmitted to the first conductive film 42 through the contact hole 34CH. Thereafter the video signal is transmitted from the first conductive film 42 to the second electrode 40 of the pixel capacitance through the contact hole 40CH, and then is transmitted to the reflective electrode 5 through the contact hole 42CH as shown in FIG. 16. The contact hole 42CH is positioned over the field oxide film 39. The top surface of the field oxide film 39 is situated at a higher level than other elements because of the large thickness of the field oxide film 39. By placing the contact hole 42CH over the field oxide film 39, the contact hole 42CH can be located nearer to the upper conductive layer, and thereby the length of electrical connection at the contact hole 42CH can be shortened.

The second insulating interlayer film 43 insulates the second conductive film 44 from the first conductive film 42. The second insulating interlayer film 43 is formed of two layers composed of a planarizing film 43A for filling indentations and reducing unevenness caused by underlying elements and an insulating film 43B overlying the planarizing film 43A. The planarizing film 43A is fabricated by applying SOG (Spin-On-Glass), and the insulating film 43B is an $SiO_2$ film fabricated by a CVD process using TEOS (Tetraethylorthosilicate) as reactive gas. The second insulating interlayer film 43 is planarized by polishing it using the CMP (Chemical Mechanical Polishing) process after it is applied on the silicon substrate 1. The first light-blocking film 44 is fabricated on the planarized second insulating interlayer film. The first light-blocking film 44 is formed of the same multilayer metal film made of titanium tungsten (TiW) and aluminum as the first conductive film 42.

The first light-blocking film 44 covers the approximately entire area of the drive circuit substrate 1, and openings are made only at the contact holes 42CH shown in FIG. 16. The third insulating interlayer film 45 is fabricated on the first light-blocking film 44, by the CVD process using TEOS (Tetraethylorthosilicate) as reactive gas. Further, the second light-blocking film 46 is formed on the third insulating interlayer film 45, and is formed of the same multilayer metal film made of titanium tungsten (TiW) and aluminum as the first conductive film 42. The second light-blocking film 46 is connected to the first conductive film 42 via the contact hole 42CH. In the contact hole 42CH, the metal film forming the first light-blocking film 44 and the metal film forming the second light-blocking film 46 are laminated for electrical connection.

When the first light-blocking film 44 and the second light-blocking film 46 are made of conductive films, the third interlayer film 45 made of an insulating (dielectric) film is interposed therebetween, the pixel-potential control signal is applied to the first light-blocking film 44, and a gray scale voltage is applied to the second light-blocking film 46, a pixel capacitance can be formed between the first light-blocking film 44 and the second light-blocking film 46.

In view of the withstand voltage of the third insulating interlayer film 45 with respect to gray scale voltage and increasing of the capacitance by reducing the thickness of the dielectric film 45, it is desired that the thickness of the third insulating interlayer film 45 is in a range of from 150 nm to 450 nm, and is preferably about 300 nm.

Figure 18:
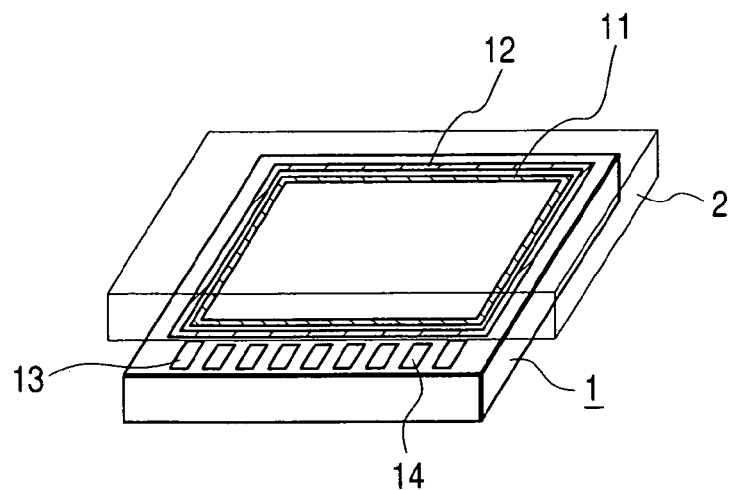
FIG. 18 is a schematic perspective view of a liquid crystal display panel of a liquid crystal display device in accordance with an embodiment of the present invention.

FIG. 18 is a perspective view of the drive circuit substrate 1 superposed with the transparent substrate 2. Formed at the periphery of the drive circuit substrate 1 is the peripheral frame 11, and the liquid crystal composition 3 is confined in a space surrounded by the peripheral frame 11, the drive circuit substrate 1 and the transparent substrate 2. The sealing member 12 is coated around the outside of the peripheral frame 11 between the superposed drive circuit substrate 1 and transparent substrate 2. The drive circuit substrate 1 and the transparent substrate 2 are fixed together by the sealing member 12 to form the liquid crystal display panel 100. Reference numeral 13 denote terminals for external connection.

Figure 19:
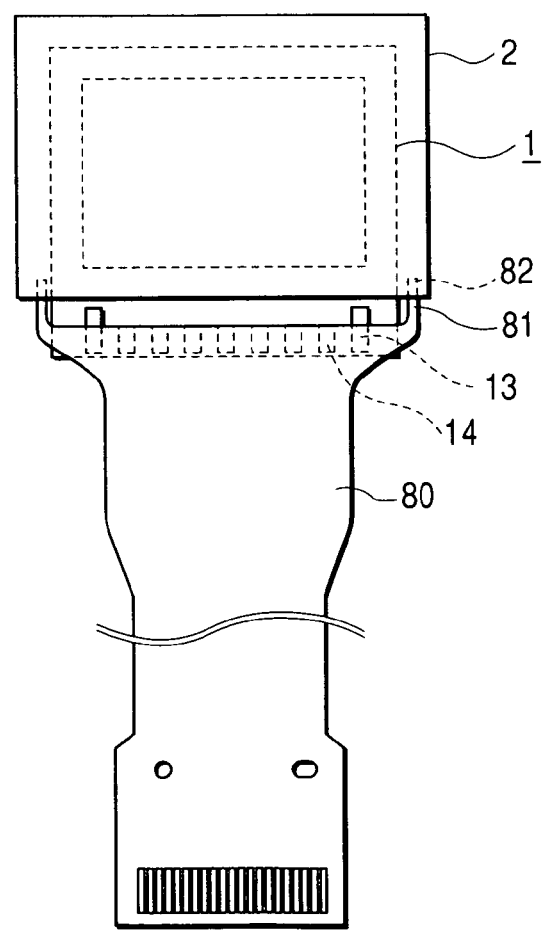
FIG. 19 is a schematic plan view for explaining the condition of a flexible printed circuit board connected to a liquid crystal panel of a liquid crystal display panel of a liquid crystal display device in accordance with an embodiment of the present invention.

Next, as shown in FIG. 19, a flexible printed wiring board 80 for supplying external signals to the liquid crystal display panel 100 is connected to terminals 13 for external connections. Two outermost terminals on opposite sides of one end of the flexible printed wiring board 80 are made longer than the remainder of terminals, are connected to the counter electrode 5 formed on the transparent substrate 2, and thereby serve as counter-electrode terminals 81. In this way, the flexible printed writing board 80 is connected to both of the drive circuit substrate 1 and the transparent substrate 2.

Conventionally, a flexible printed wiring board is connected to terminals for external connections disposed on the drive circuit substrate 1 only, and therefore the wiring to the counter electrode 5 from the flexible printed wiring board is made via the drive circuit substrate 1. The transparent substrate 2 in this embodiment of the present invention is provided with connecting portions 82 to be connected to the flexible printed wiring board 80 such that the flexible printed wiring board 80 is connected directly to the counter electrode 5. The liquid crystal display panel 100 is formed by superposing the transparent substrate 2 on the drive circuit substrate 1. The transparent substrate 2 is superposed on the drive circuit substrate 1 such that a peripheral portion of the transparent substrate 2 extends beyond the outside edges of the drive circuit substrate 1 and provides the connecting portions 82 where the flexible printed wiring board 80 is connected to the counter electrode 5.

Figure 20:
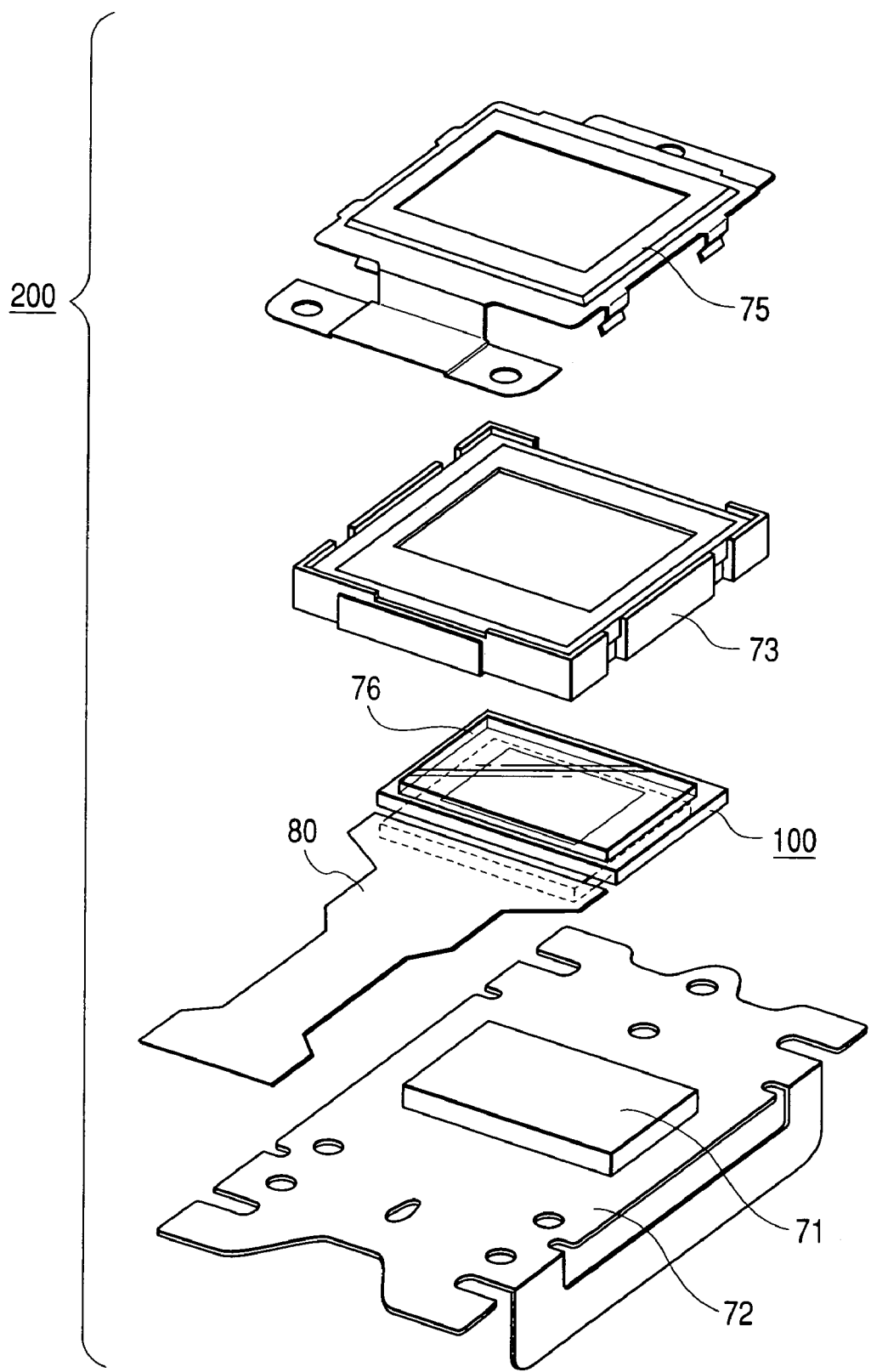
FIG. 20 is an exploded perspective view of a liquid crystal display device in accordance with an embodiment of the present invention.
Figure 21:
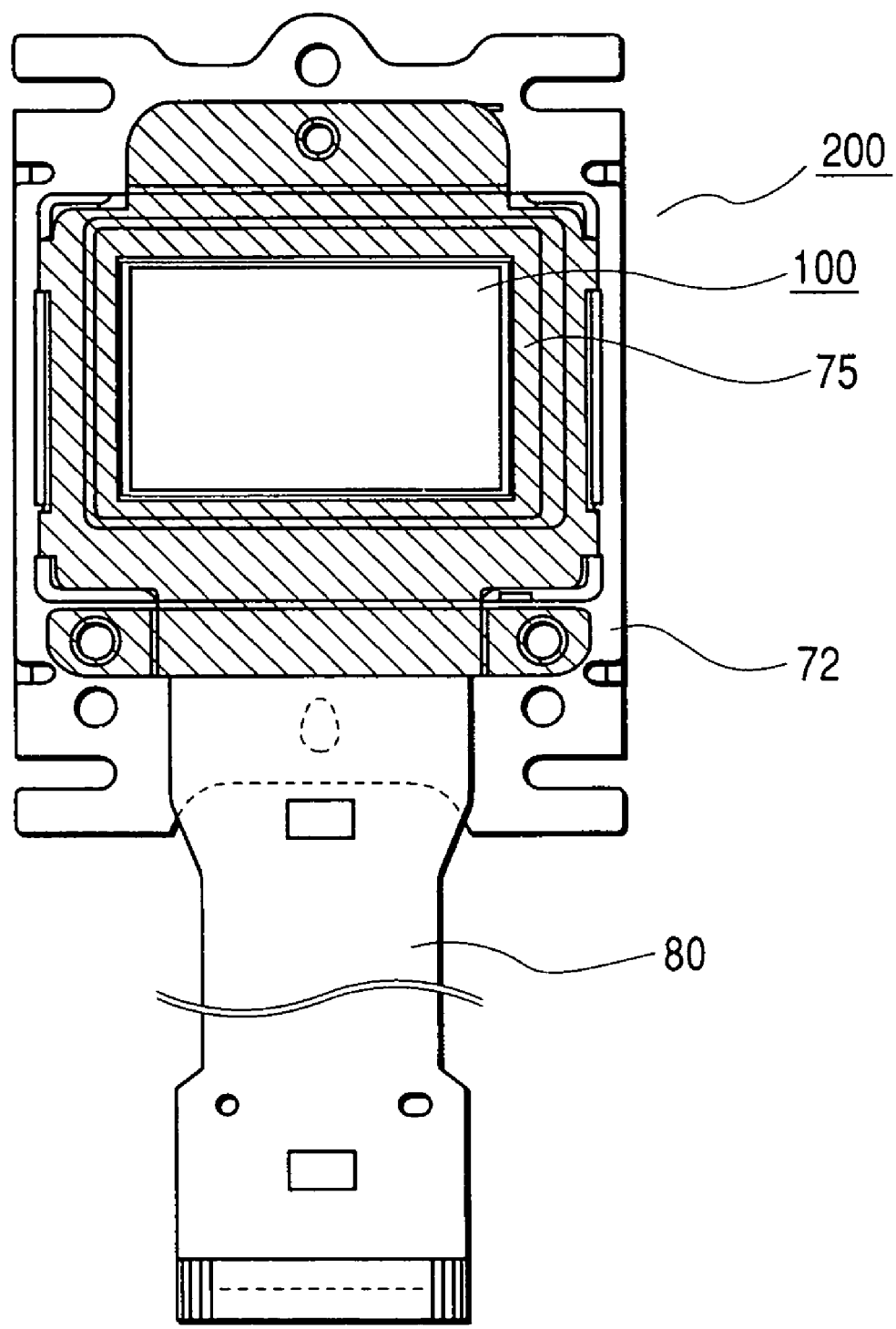
FIG. 21 is a schematic plan view of a liquid crystal panel of a liquid crystal display panel of a liquid crystal display device in accordance with an embodiment of the present invention.

FIGS. 20 and 21 illustrate a configuration of the liquid crystal display device 200. FIG. 20 is an exploded view in perspective of the major elements of the liquid crystal display device 200, and FIG. 21 is a plan view of the liquid crystal display device 200.

As shown in FIG. 20, the liquid crystal display panel 100 having the flexible printed wiring board 80 connected thereto is disposed on the heat-radiating plate 72 with a cushion member 71 interposed therebetween. The cushion member 71 is highly heat-conductive, and fills a gap between the heat-radiating plate 72 and the liquid crystal display panel 100 for heat from the liquid crystal display panel 100 to conduct to the heat-radiating plate 72 easily. Reference numeral 73 denotes a mold, which is fixed to the heat-radiating plate 72 with an adhesive.

As shown in FIG. 21, the flexible printed wiring board 80 is pass between the mold 73 and the heat-radiating plate 72, and then is brought out of the mold 73. Reference numeral 75 denotes a light-blocking plate which prevents light from a light source from entering the unintended portions of the liquid crystal display device 200, and 76 is a light-blocking frame which defines the display area of the liquid crystal display device 200.

The invention by the present inventors has been explained concretely based upon the embodiments in accordance with the present invention, but the present invention is not limited to the above-described embodiments, and various changes and modifications can be made without departing from the spirit and scope of the present invention.

The advantages obtained by the representative ones of the inventions disposed in this specification can be summarized as follows:

The present invention makes it possible to form drive circuits by using low-voltage circuits when the drive circuits are incorporated into a liquid crystal display element, and is capable of reducing an area occupied by the drive circuits and an area occupied by each pixel, thereby making possible high-speed operation of the circuits. Further, the present invention is capable of realizing a small-sized high-definition liquid crystal display element

What is claimed is:

1. A liquid crystal display device comprising:
a first substrate;
a second substrate;
a liquid crystal composition sandwiched between said first substrate and said second substrate;
a plurality of pixels disposed on said first substrate;
each of said plurality of pixels being supplied with a video signal via a switching element connected to a first electrode thereof;
each of said plurality of pixels being provided with a capacitance;
one of two capacitance-forming electrodes forming said capacitance being connected to said first electrode of a corresponding one of said plurality of pixels;
another of said two capacitance-forming electrodes being supplied with a pixel-potential control signal by a pixel-potential control circuit; and
light-blocking films overlapping gaps between electrodes forming said plurality of pixels on said first substrate;
wherein a polarity of said video signal reverses with respect to a first reference voltage with a repetition period;
wherein said pixel-potential control signal alternates between two voltage levels of the same polarity with respect to a second reference voltage so that a voltage on said first electrode of the corresponding one of said plurality of pixels is reversed in polarity with respect to said first reference voltage;
wherein said pixel-potential control signal is provided via a corresponding one of said light-blocking films; and
wherein said light-blocking films are formed above said pixel-potential circuit.

2. A liquid crystal display device according to claim 1, wherein said first substrate is comprised of silicon.

3. A liquid crystal display device comprising:
a first substrate;
a second substrate;
a liquid crystal composition sandwiched between said first substrate and said second substrate; and
a plurality of pixels disposed on said first substrate;
each of said plurality of pixels being supplied with a video signal via a switching element connected to a first electrode thereof;
each of said plurality of pixels being provided with a capacitance;
one of two capacitance-forming electrodes forming said capacitance being connected to said first electrode of a corresponding one of said plurality of pixels; and
another of said two capacitance-forming electrodes being supplied with a pixel-potential control signal by a pixel-potential control circuit;
wherein a polarity of said video signal reverses with respect to a first reference voltage with a repetition period;
wherein said pixel-potential control signal alternates between a first voltage level and a second voltage level so that a voltage on said first electrode of the corresponding one of said plurality of pixels changes into a reverse polarity with respect to said first reference voltage; and
wherein said pixel-potential control circuit enables selections of said first voltage level and said second voltage level.

4. A liquid crystal display device according to claim 3, wherein said first substrate is comprised of silicon.

* * * * *